US010442991B2

(12) United States Patent
Matsuda et al.

(10) Patent No.: US 10,442,991 B2
(45) Date of Patent: Oct. 15, 2019

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Naoko Matsuda, Chiba (JP); Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

(21) Appl. No.: 15/479,285

(22) Filed: Apr. 5, 2017

(65) Prior Publication Data

US 2017/0298275 A1  Oct. 19, 2017

(30) Foreign Application Priority Data

Apr. 15, 2016  (JP) ................ 2016-081615

(51) Int. Cl.
| | | |
|---|---|---|
| G02F 1/1333 | (2006.01) | |
| C09K 19/34 | (2006.01) | |
| C09K 19/30 | (2006.01) | |
| C09K 19/02 | (2006.01) | |
| G02F 1/1362 | (2006.01) | |
| C09K 19/20 | (2006.01) | |
| C09K 19/04 | (2006.01) | |
| C09K 19/12 | (2006.01) | |

(52) U.S. Cl.
CPC ...... *C09K 19/3402* (2013.01); *C09K 19/0208* (2013.01); *C09K 19/0216* (2013.01); *C09K 19/20* (2013.01); *C09K 19/3003* (2013.01); *C09K 19/3066* (2013.01); *C09K 19/3068* (2013.01); *G02F 1/1362* (2013.01); *C09K 2019/0466* (2013.01); *C09K 2019/123* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3071* (2013.01); *C09K 2019/3077* (2013.01); *C09K 2019/3078* (2013.01); *C09K 2019/3422* (2013.01)

(58) Field of Classification Search
CPC ............ C09K 19/3402; C09K 19/0208; C09K 19/0216; C09K 19/20; C09K 19/3003; C09K 19/3066; C09K 19/3068; G02F 1/1333; G02F 1/1362; G02F 2019/0466; G02F 2019/123; G02F 2019/3004; G02F 2019/3009; G02F 2019/301; G02F 2019/3015; G02F 2019/3016; G02F 2019/3071; G02F 2019/3077; G02F 2019/3078; G02F 2019/3422
USPC .................................................... 252/299.66
See application file for complete search history.

(56) References Cited

U.S. PATENT DOCUMENTS

| | | | |
|---|---|---|---|
| 5,728,319 A | 3/1998 | Matsui et al. | |
| 6,315,922 B1 | 11/2001 | Takeshita et al. | |
| 8,147,929 B2 * | 4/2012 | Saito ............... | C09K 19/20 |
| | | | 252/299.61 |
| 9,434,883 B2 * | 9/2016 | Furusato ......... | C09K 19/20 |
| 9,487,703 B2 * | 11/2016 | Saito ............... | C09K 19/3402 |
| 2009/0194739 A1 | 8/2009 | Wittek et al. | |
| 2012/0229751 A1 | 9/2012 | Yanai et al. | |

FOREIGN PATENT DOCUMENTS

| | | |
|---|---|---|
| JP | 2001003053 | 1/2001 |
| JP | 2009185285 | 8/2009 |
| WO | 9611897 | 4/1996 |
| WO | 2011065299 | 6/2011 |

* cited by examiner

*Primary Examiner* — Geraldina Visconti
(74) *Attorney, Agent, or Firm* — JCIPRNET

(57) ABSTRACT

Shown is a liquid crystal composition satisfying at least one of characteristics such as high maximum temperature, low minimum temperature, small viscosity, suitable optical anisotropy, large dielectric anisotropy and small frequency dependence, or has a suitable balance regarding at least two of the characteristics, and an AM device including the composition. The liquid crystal composition contains a specific compound having large positive dielectric anisotropy as a first component, and a specific compound having small viscosity as a second component, and may contain a specific compound having high maximum temperature or small viscosity as a third component, a specific compound having positive dielectric anisotropy as a fourth component or a specific compound having negative dielectric anisotropy as a fifth component.

20 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2016-081615, filed on Apr. 15, 2016. The entirety of the above-mentioned patent applications is hereby incorporated by reference herein and made a part of this specification.

TECHNICAL FIELD

The invention relates to a liquid crystal composition mainly suitable for use in an active matrix (AM) device and so forth, a liquid crystal display device including the composition, and so forth. In particular, the invention relates to a liquid crystal composition having positive dielectric anisotropy, and an AM device that includes the composition and has a mode such as a TN mode, an OCB mode, an IPS mode, an FFS mode or an FPA mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type based on a production process. A classification based on a light source includes a reflective type utilizing natural light, a transmissive type utilizing backlight and a transflective type utilizing both the natural light and the backlight.

The devices include a liquid crystal composition having suitable characteristics. The liquid crystal composition has a nematic phase. Characteristics of the composition are improved in order to obtain an AM device having good characteristics. Table 1 below summarizes a relationship in two characteristics. The characteristics of the composition will be further described based on a commercially available AM device. A temperature range of the nematic phase relates to a temperature range in which the device can be used. Preferred maximum temperature of the nematic phase is about 70° C. or higher and preferred minimum temperature of the nematic phase is about −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at a low temperature is further preferred. An elastic constant of the composition relates to a response time and contrast in the device. In order to increase the contrast of the device, a large elastic constant in the composition is further preferred. As a ratio of the elastic constant to viscosity is larger in the composition, the response time in the device is shorter. The ratio of the elastic constant to the viscosity is preferably 0.8 nN/Pa·s (nm$^2$/s) or more.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

Optical anisotropy of the composition relates to a contrast ratio in the device. According to a mode of the device, large optical anisotropy or small optical anisotropy, more specifically, suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having a mode such as TN, a suitable value is about 0.45 micrometer. In the above case, a composition having the large optical anisotropy is preferred for a device having a small cell gap. Large dielectric anisotropy in the composition contributes to low threshold voltage, small electric power consumption and a large contrast ratio in the device. Accordingly, the large dielectric anisotropy is preferred. Moreover, as a driving frequency is higher, a motion of liquid crystal molecules at low temperature is more difficult to follow a frequency change of voltage, and therefore a problem of incapability of displaying by reduction of contrast occurs. For avoiding such a poor display, a composition being excellent in frequency dependence of dielectric anisotropy in a low temperature region (being small in the frequency dependence), more specifically, allowing to have a fixed value of the dielectric anisotropy up to a higher frequency region is preferred. Large specific resistance in the composition contributes to a large voltage holding ratio and the large contrast ratio in the device. Accordingly, a composition having the large specific resistance at room temperature and also at a temperature close to the maximum temperature of the nematic phase in an initial stage is preferred. The composition having the large specific resistance at room temperature and also at the temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device use in a liquid crystal projector, a liquid crystal television and so forth. A large elastic constant in the composition contributes to a short response time and the large contrast ratio in the device. Accordingly, the large elastic constant is preferred.

A composition having positive dielectric anisotropy is used in an AM device having the TN mode. A composition having negative dielectric anisotropy is used in an AM device having the VA mode. In an AM device having the IPS mode or the FFS mode, a composition having positive or negative dielectric anisotropy is used. In an AM device having a polymer sustained alignment (PSA) mode, a composition having positive or negative dielectric anisotropy is used. Examples of the liquid crystal composition used in the liquid crystal display device and having positive dielectric anisotropy are disclosed in Patent Literature described below.

CITATION LIST

Patent Literature

Patent literature No. 1: WO 1996/11897 A.
Patent literature No. 2: JP 2001-3053 A.
Patent literature No. 3: JP 2009-185285 A.
Patent literature No. 4: WO 2011/65299 A.

A desirable AM device has characteristics such as a wide usable temperature range, a short response time, a large contrast ratio, low threshold voltage, a large voltage holding ratio and a long service life. A shorter response time even by one millisecond is desirable. Accordingly, desirable characteristics in the composition include high maximum temperature of a nematic phase, low minimum temperature of the nematic phase, small viscosity, large optical anisotropy, large dielectric anisotropy, large specific resistance, high stability to ultraviolet light and high stability to heat.

SUMMARY OF INVENTION

Technical Problem

The invention provides a liquid crystal composition satisfying at least one of characteristics such as high maximum temperature of a nematic phase, low minimum temperature of the nematic phase, small viscosity, suitable optical anisotropy, large dielectric anisotropy, small frequency dependence, large specific resistance, high stability to ultraviolet light, high stability to heat and a large elastic constant. The invention further provides a liquid crystal composition having a suitable balance regarding at least two of the characteristics. The invention also provides a liquid crystal display device including such a composition. The invention yet further provides a composition having large optical anisotropy, large dielectric anisotropy, high stability to ultraviolet light and so forth; and an AM device having characteristics such as a short response time, a large voltage holding ratio, low threshold voltage, a large contrast ratio and a long service life.

Solution to Problem

The invention concerns a liquid crystal display device formed of a pair of substrates at least one of which is transparent, having a liquid crystal composition interposed between the substrates, and including an alignment layer, a polarizing plate and a transparent electrode, wherein the liquid crystal composition has positive dielectric anisotropy and contains at least one compound selected from the group of compounds represented by formula (1) as a first component, and at least one compound selected from the group of compounds represented by formula (2) as a second component, and the liquid crystal display device includes the composition:

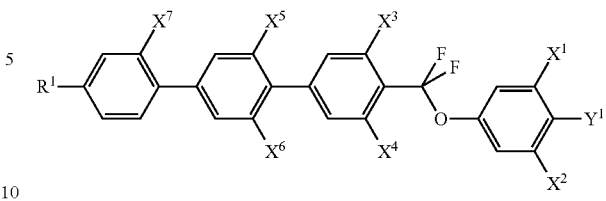

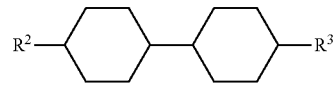

wherein, in formula (1) and formula (2), $R^1$ is alkyl having 1 to 12 carbons, alkoxy having 1 to 12 carbons or alkenyl having 2 to 12 carbons; $R^2$ and $R^3$ are independently alkenyl having 2 to 12 carbons; $X^1$, $X^2$, $X^3$, $X^4$, $X^5$, $X^6$ and $X^7$ are independently hydrogen or fluorine; and $Y^1$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine.

Advantageous Effects of Invention

An advantage of the invention is a liquid crystal composition satisfying at least one of characteristics such as high maximum temperature of a nematic phase, low minimum temperature of the nematic phase, small viscosity, suitable optical anisotropy, large dielectric anisotropy, large specific resistance, high stability to ultraviolet light, high stability to heat and a large elastic constant. Another advantage is a liquid crystal composition having a suitable balance regarding at least two of characteristics. Another advantage is a liquid crystal display device including such a composition. Another advantage is a composition having large optical anisotropy, large dielectric anisotropy, high stability to ultraviolet light and so forth; and an AM device having characteristics such as a short response time, a large voltage holding ratio, low threshold voltage, a large contrast ratio and a long service life.

DESCRIPTION OF EMBODIMENTS

Usage of terms herein is as described below. Terms "liquid crystal composition" and "liquid crystal display device" may be occasionally abbreviated as "composition" and "device," respectively. "Liquid crystal display device" is a generic term for a liquid crystal display panel and a liquid crystal display module. "Liquid crystal compound" is a generic term for a compound having a liquid crystal phase such as a nematic phase and a smectic phase, and a compound having no liquid crystal phase but to be mixed with a composition for the purpose of adjusting characteristics such as a temperature range of the nematic phase, viscosity and dielectric anisotropy. The compound has a six-membered ring such as 1,4-cyclohexylene and 1,4-phenylene, and has rod-like molecular structure. "Polymerizable compound" is a compound to be added for the purpose of forming a polymer in the composition. At least one compound selected from the group of compounds represented by formula (1) may be occasionally abbreviated as "compound (1)." "Compound (1)" means one compound or two or more compounds represented by formula (1). A same rule applies also to any other compound represented by any other formula. An expression "at least one piece of" in the context of "replaced by" means that not only a position but also the number thereof may be selected without restriction.

The liquid crystal composition is prepared by mixing a plurality of liquid crystal compounds. An additive is added to the composition for the purpose of further adjusting physical properties thereof. The additive such as an optically active compound, an antioxidant, an ultraviolet light absorber, a dye, an antifoaming agent, the polymerizable compound, a polymerization initiator, a polymerization inhibitor and a polar compound is added when necessary. The liquid crystal compound and the additive are mixed in such a procedure. A proportion (content) of the liquid crystal compounds is expressed in terms of weight percent (by weight) based on the weight of the liquid crystal composition containing no additive, even after the additive has been added. A proportion (amount of addition) of the additive is expressed in terms of weight percent (o by weight) based on the weight of the liquid crystal composition containing no additive in a manner similar to the proportion of the liquid crystal compounds. Weight parts per million (ppm) may be occasionally used. A proportion of the polymerization initiator and the polymerization inhibitor is exceptionally expressed based on the weight of the polymerizable compound.

"Maximum temperature of the nematic phase" may be occasionally abbreviated as "maximum temperature." "Minimum temperature of the nematic phase" may be occasionally abbreviated as "minimum temperature." An expression "having large specific resistance" means that the composition has large specific resistance at room temperature and also at a temperature close to the maximum temperature of the nematic phase in an initial stage, and the composition has the large specific resistance at room temperature and also at a temperature close to the maximum temperature of the nematic phase even after the device has been used for a long period of time. An expression "having a large voltage holding ratio" means that the device has a large voltage holding ratio at room temperature and also at a temperature close to the maximum temperature of the nematic phase in the initial stage, and the device has the large voltage holding ratio at room temperature and also at a temperature close to the maximum temperature of the nematic phase even after the device has been used for a long period of time. An expression "increase the dielectric anisotropy" means that a value of dielectric anisotropy positively increases in a composition having positive dielectric anisotropy, and the value of dielectric anisotropy negatively increases in a composition having negative dielectric anisotropy.

An expression "at least one piece of 'A' may be replaced by 'B'" means that the number of 'A' is arbitrary. When the number of 'A' is 1, a position of 'A' is arbitrary, and also when the number of 'A' is 2 or more, positions thereof can be selected without restriction. A same rule applies also to an expression "at least one piece of 'A' is replaced by 'B'."

A symbol of terminal group $R^1$ is used for a plurality of compounds in chemical formulas of component compounds. In the compounds, two groups represented by two pieces of arbitrary $R^1$ may be identical or different. For example, in one case, $R^1$ of compound (1) is ethyl and $R^1$ of compound (1-1) is ethyl. In another case, $R^1$ of compound (1) is ethyl and $R^1$ of compound (1-1) is propyl. A same rule applies also to a symbol such as $R^2$. In formula (3), when a is 2, two of ring A exists. In the compound, two rings represented by two of ring A may be identical or different. A same rule applies also to two of arbitrary ring A when a is larger than 2. A same rule applies also to $Z^1$, ring C or the like.

Then, 2-fluoro-1,4-phenylene means two divalent groups described below. In a chemical formula, fluorine may be leftward (L) or rightward (R). A same rule applies also to a divalent group of a left-right asymmetrical ring such as tetrahydropyran-2,5-diyl.

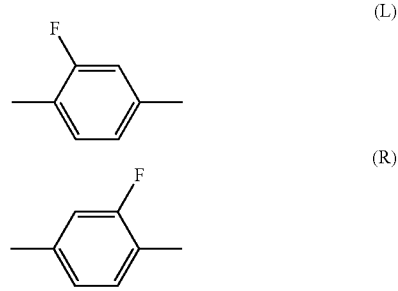

The invention includes items described below.

Item 1. A liquid crystal composition that has positive dielectric anisotropy and contains at least one compound selected from the group of compounds represented by formula (1) as a first component, and at least one compound selected from the group of compounds represented by formula (2) as a second component:

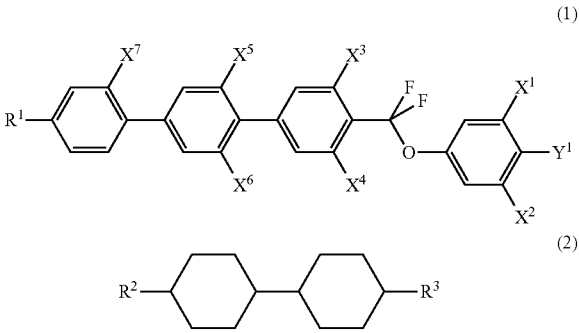

wherein, in formula (1) and formula (2), $R^1$ is alkyl having 1 to 12 carbons, alkoxy having 1 to 12 carbons or alkenyl having 2 to 12 carbons; $R^2$ and $R^3$ are independently alkenyl having 2 to 12 carbons; $X^1$, $X^2$, $X^3$, $X^4$, $X^5$, $X^6$ and $X^7$ are independently hydrogen or fluorine; and $Y^1$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine.

Item 2. The liquid crystal composition according to item 1, containing at least one compound selected from the group of compounds represented by formula (1-1) to formula (1-4) as the first component:

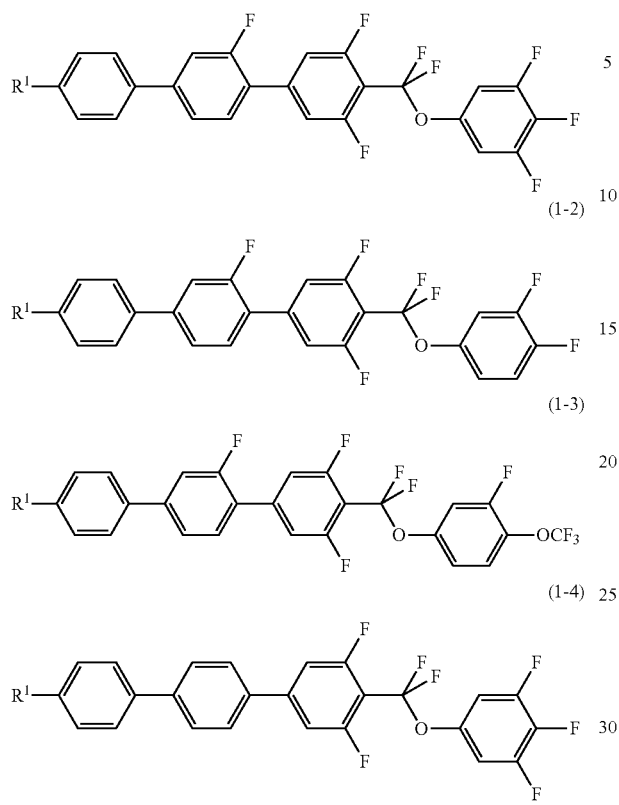

(1-1)

(1-2)

(1-3)

(1-4)

wherein, in formula (1-1) to formula (1-4), $R^1$ is alkyl having 1 to 12 carbons, alkoxy having 1 to 12 carbons or alkenyl having 2 to 12 carbons.

Item 3. The liquid crystal composition according to item 1 or 2, wherein a proportion of the first component is in the range of 5% by weight to 40% by weight, and a proportion of the second component is in the range of 10% by weight to 70% by weight based on the weight of the liquid crystal composition.

Item 4. The liquid crystal composition according to any one of items 1 to 3, further containing at least one compound selected from the group of compounds represented by formula (3) as a third component:

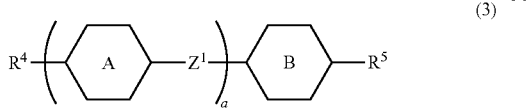

(3)

wherein, in formula (3), $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine; $R^5$ is alkyl having 1 to 12 carbons or alkoxy having 1 to 12 carbons; ring A and ring B are independently 1,4-cyclohexylene, 1,4-phenylene, 2-fluoro-1,4-phenylene or 2,5-difluoro-1,4-phenylene; $Z^1$ is a single bond, ethylene, carbonyloxy or methyleneoxy; and a is 1, 2 or 3.

Item 5. The liquid crystal composition according to any one of items 1 to 4, containing at least one compound selected from the group of compounds represented by formula (3-1) to formula (3-13) as the third component:

(3-1)

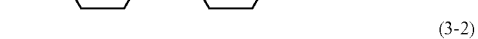

(3-2)

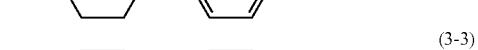

(3-3)

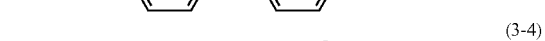

(3-4)

(3-5)

(3-6)

(3-7)

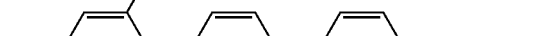

(3-8)

(3-9)

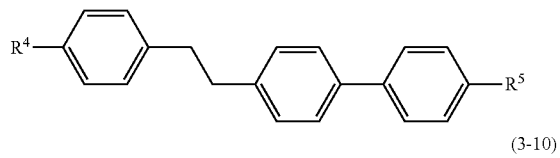

(3-10)

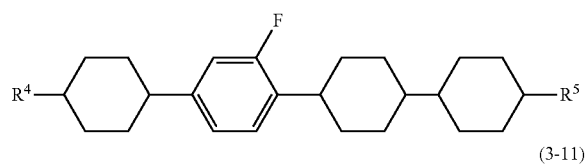

(3-11)

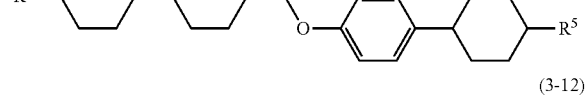

(3-12)

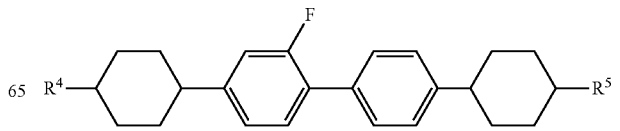

(3-13)

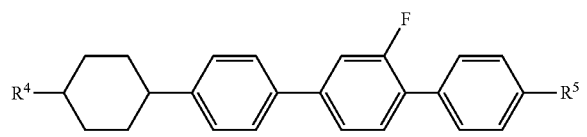

wherein, in formula (3-1) to formula (3-13), $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine; and $R^5$ is alkyl having 1 to 12 carbons or alkoxy having 1 to 12 carbons.

Item 6. The liquid crystal composition according to item 4 or 5, wherein a proportion of the third component is in the range of 10% by weight to 80% by weight based on the weight of the liquid crystal composition.

Item 7. The liquid crystal composition according to any one of items 1 to 6, further containing at least one compound selected from the group of compounds represented by formula (4) as a fourth component:

(4)

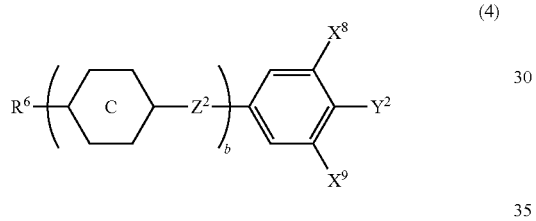

wherein, in formula (4), $R^6$ is alkyl having 1 to 12 carbons, alkoxy having 1 to 12 carbons or alkenyl having 2 to 12 carbons; ring C is 1,4-cyclohexylene, 1,4-phenylene, 2-fluoro-1,4-phenylene, 2,3-difluoro-1,4-phenylene, 2,6-difluoro-1,4-phenylene, tetrahydropyran-2,5-diyl, 1,3-dioxane-2,5-diyl or pyrimidine-2,5-diyl; $Z^2$ is a single bond, ethylene, carbonyloxy or difluoromethyleneoxy; $X^8$ and $X^9$ are independently hydrogen or fluorine; $Y^2$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine; and b is 1, 2, 3 or 4; in which, a compound represented by formula (1) is excluded.

Item 8. The liquid crystal composition according to any one of items 1 to 7, containing at least one compound selected from the group of compounds represented by formula (4-1) to formula (4-33) as the fourth component:

(4-1)

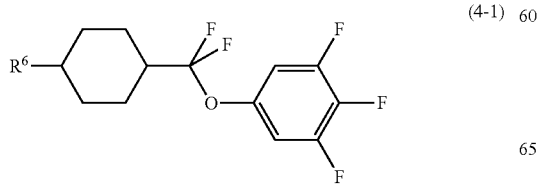

(4-2)

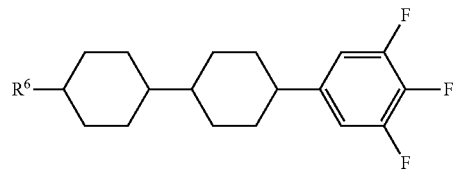

(4-3)

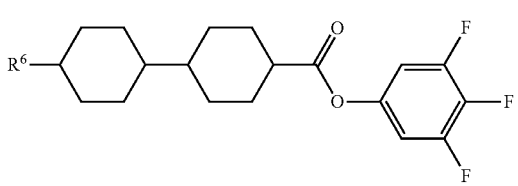

(4-4)

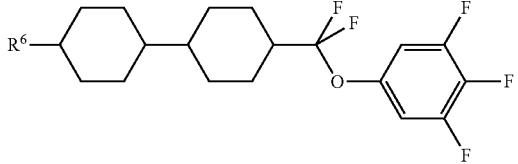

(4-5)

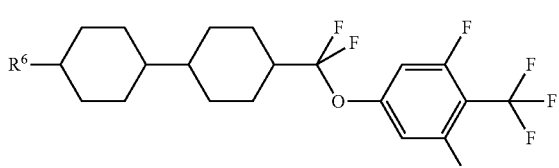

(4-6)

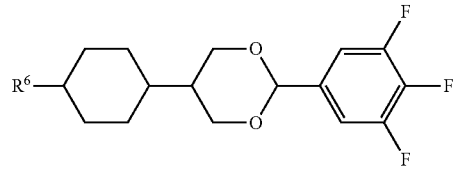

(4-7)

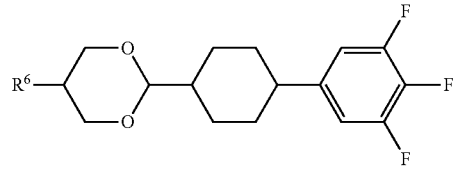

(4-8)

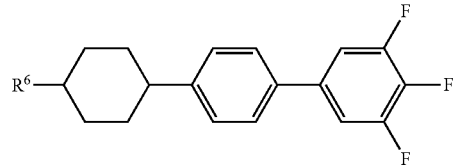

(4-9)

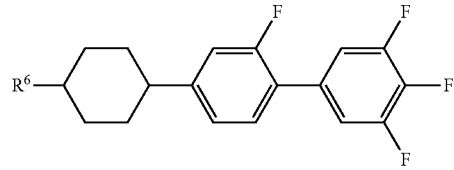

(4-10) 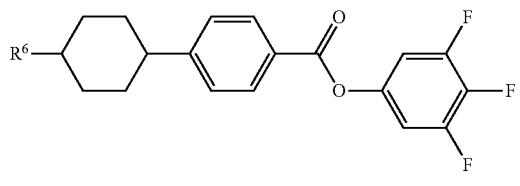
(4-11) 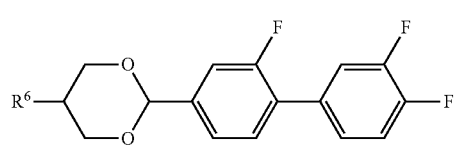
(4-12) 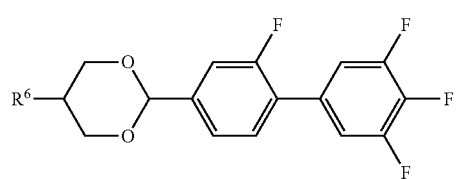
(4-13) 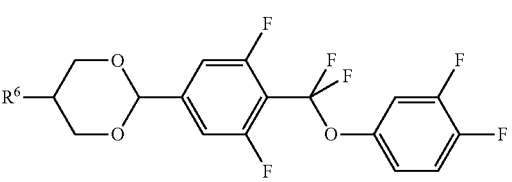
(4-14) 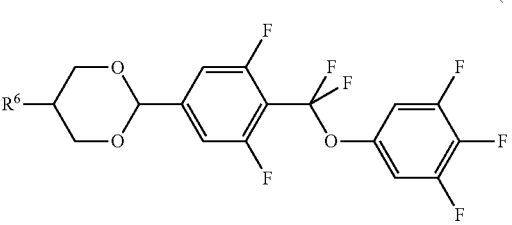
(4-15) 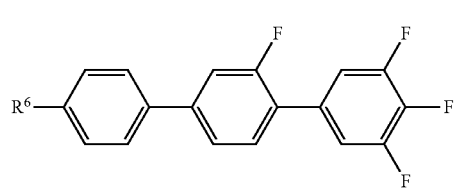
(4-16) 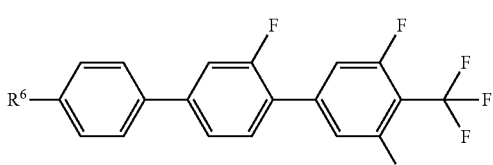
(4-17) 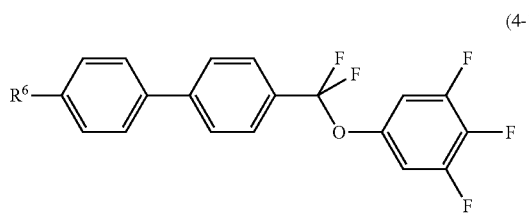
(4-18) 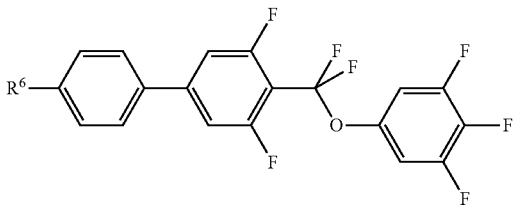
(4-19) 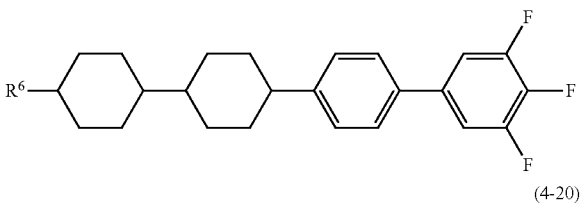
(4-20) 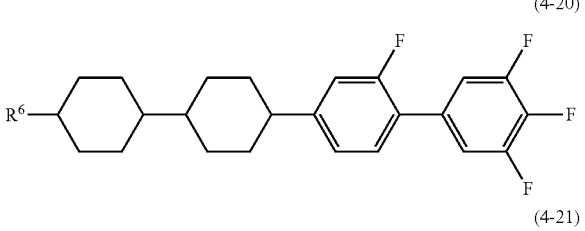
(4-21) 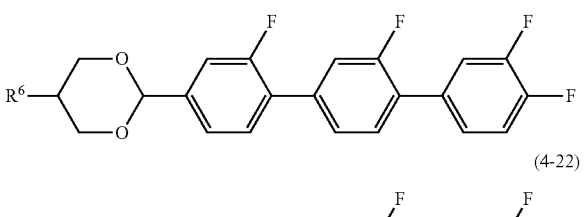
(4-22) 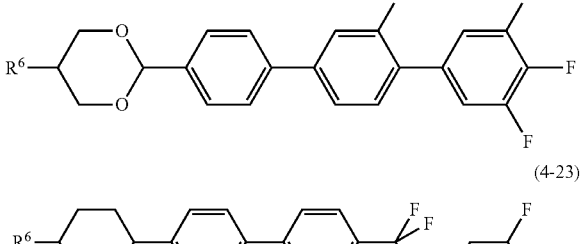
(4-23) 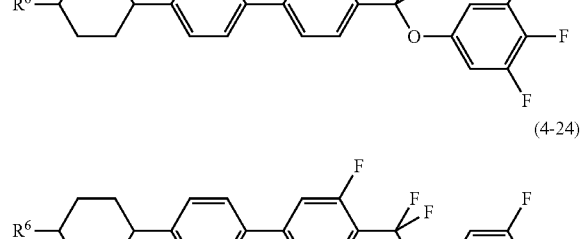
(4-24) 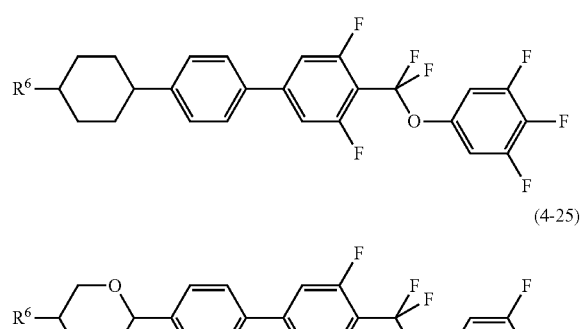
(4-25)

(4-26)
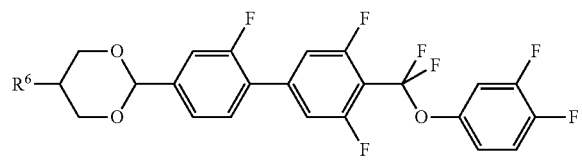

(4-27)
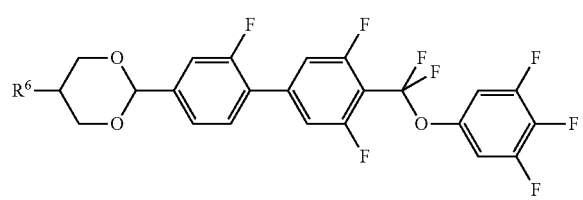

(4-28)
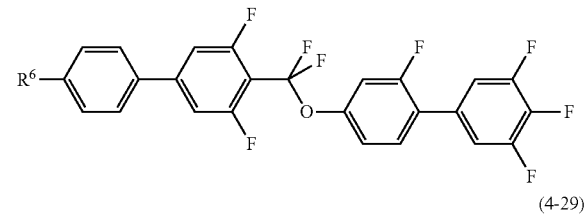

(4-29)

(4-30)

(4-31)
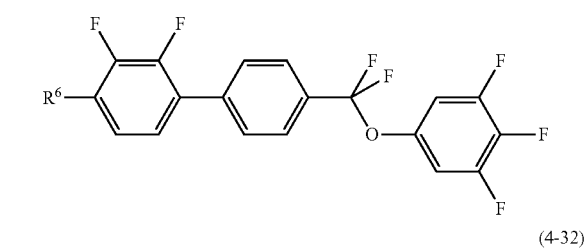

(4-32)
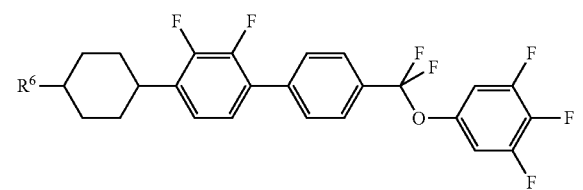

(4-33)
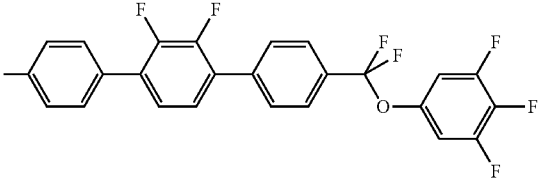

wherein, in formula (4-1) to formula (4-33), $R^6$ is alkyl having 1 to 12 carbons, alkoxy having 1 to 12 carbons or alkenyl having 2 to 12 carbons.

Item 9. The liquid crystal composition according to item 7 or 8, wherein a proportion of the fourth component is in the range of 3% by weight to 40% by weight based on the weight of the liquid crystal composition.

Item 10. The liquid crystal composition according to any one of items 1 to 9, further containing at least one compound selected from the group of compounds represented by formula (5) as a fifth component:

$$R^7 \!-\!\left(\!\boxed{D}\!-\!Z^3\!\right)_{\!c}\!\!-\!\boxed{E}\!-\!\left(\!Z^4\!-\!\boxed{F}\!\right)_{\!d}\!\!-\!R^8 \quad (5)$$

wherein, in formula (5), $R^7$ and $R^8$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

Item 11. The liquid crystal composition according to any one of items 1 to 10, containing at least one compound selected from the group of compounds represented by formula (5-1) to formula (5-22) as the fifth component:

(5-1)
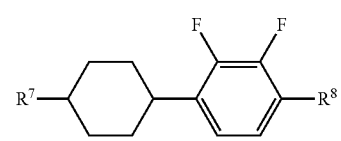

(5-2)
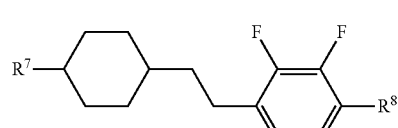

(5-3)
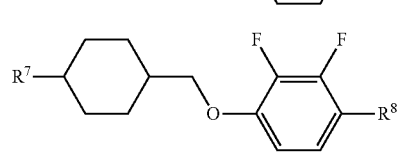

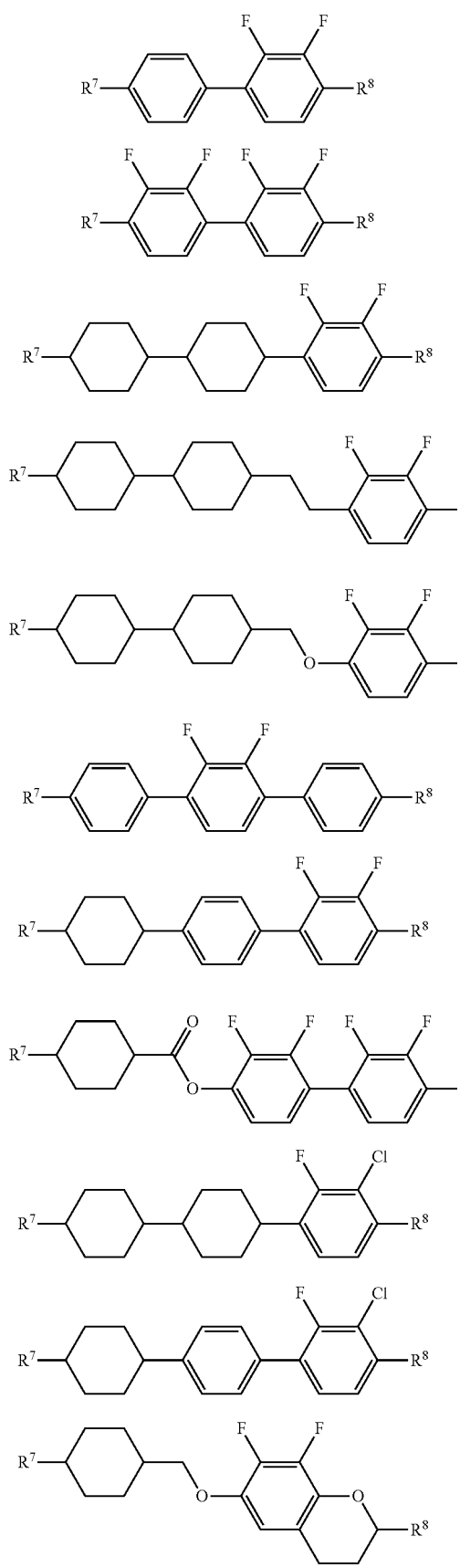
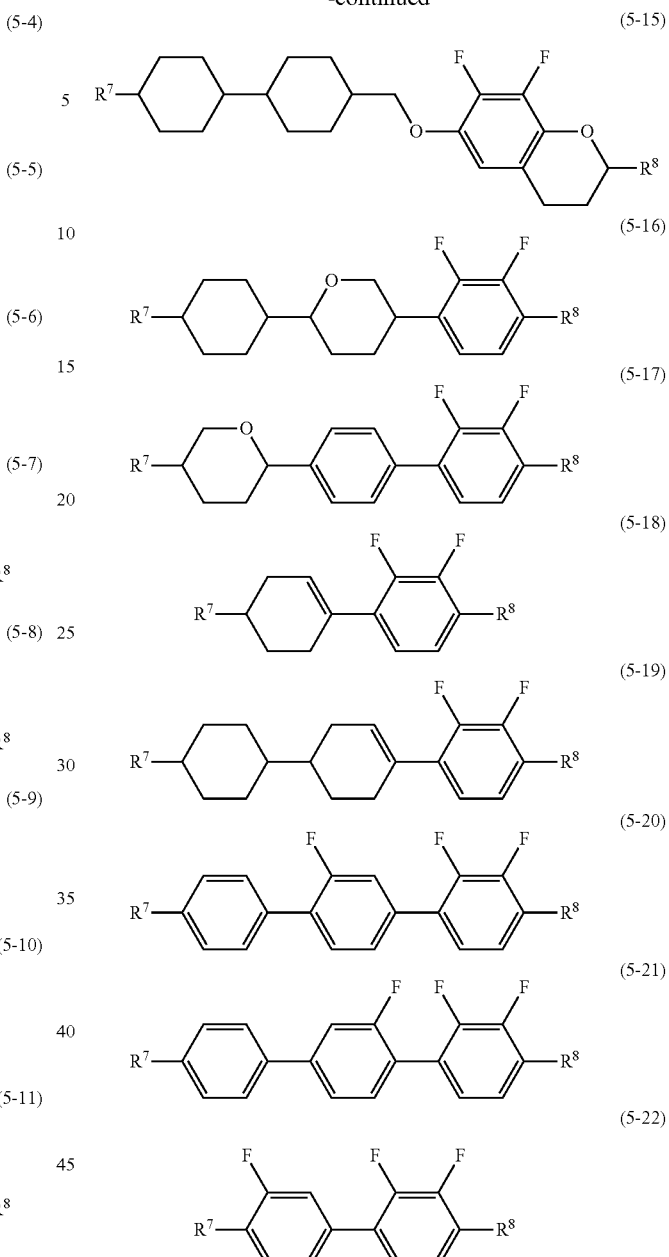

wherein, in formula (5-1) to formula (5-22), $R^7$ and $R^8$ are independently alkyl having 1 to 12 carbons, alkoxy having 1 to 12 carbons, alkenyl having 2 to 12 carbons or alkenyloxy having 2 to 12 carbons.

Item 12. The liquid crystal composition according to item 10 or 11, wherein a proportion of the fifth component is in the range of 3% by weight to 30% by weight based on the weight of the liquid crystal composition.

Item 13. The liquid crystal composition according to any one of items 1 to 12, wherein an elastic constant (K) is 11 pN or more, and a ratio of elastic constant (K) to viscosity ($\eta$) is 0.8 nN/Pa·s (nm$^2$/s) or more.

Item 14. The liquid crystal composition according to any one of items 1 to 13, wherein a frequency dependence ($\Delta\varepsilon$ (5 kHz)/$\Delta\varepsilon$ (50 Hz)) of dielectric anisotropy at −20° C. is 0.50 or more.

Item 15. A liquid crystal display device, including the liquid crystal composition according to any one of items 1 to 14.

Item 16. The liquid crystal display device according to item 15, wherein an operating mode in the liquid crystal display device includes a TN mode, an ECB mode, an OCB mode, an IPS mode, an FFS mode or an FPA mode, and a driving mode in the liquid crystal display device includes an active matrix mode.

Item 17. Use of the liquid crystal composition according to any one of items 1 to 14 in a liquid crystal display device.

The invention further includes the following items: (a) the composition, further containing at least one of additives such as an optically active compound, an antioxidant, an ultraviolet light absorber, a dye, an antifoaming agent, a polymerizable compound, a polymerization initiator, a polymerization inhibitor or a polar compound; (b) an AM device including the composition; (c) the composition further containing a polymerizable compound, and a polymer sustained alignment (PSA) mode AM device including the composition; (d) the polymer sustained alignment (PSA) mode AM device, wherein the device includes the composition, and the polymerizable compound in the composition is polymerized; (e) a device including the composition and having the PC mode, the TN mode, the STN mode, the ECB mode, the OCB mode, the IPS mode, the VA mode, the FFS mode or the FPA mode; (f) a transmissive device including the composition; (g) use of the composition as the composition having the nematic phase; and (h) use as an optically active composition by adding the optically active compound to the composition.

The composition of the invention will be described in the following order. First, a constitution of the component compounds in the composition will be described. Second, main characteristics of the component compounds and main effects of the compounds on the composition will be described. Third, a combination of components in the composition, a preferred proportion of the components and the basis thereof will be described. Fourth, a preferred embodiment of the component compounds will be described. Fifth, a preferred component compound will be described. Sixth, an additive that may be added to the composition will be described. Seventh, methods for synthesizing the component compounds will be described. Last, an application of the composition will be described.

First, the constitution of the component compounds in the composition will be described. The composition of the invention is classified into composition A and composition B. Composition A may further contain any other liquid crystal compound, an additive or the like in addition to the liquid crystal compound selected from compound (1), compound (2), compound (3), compound (4) and compound (5). An expression "any other liquid crystal compound" means a liquid crystal compound different from compound (1), compound (2), compound (3), compound (4) and compound (5). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator, the polymerization inhibitor and the polar compound.

Composition B consists essentially of liquid crystal compounds selected from compound (1), compound (2), compound (3), compound (4) and compound (5). An expression "essentially" means that the composition may contain the additive, but contains no any other liquid crystal compound. Composition B has a smaller number of components than composition A has. Composition B is preferred to composition A in view of cost reduction. Composition A is preferred to composition B in view of possibility of further adjusting the characteristics by mixing any other liquid crystal compound.

Second, the main characteristics of the component compounds and the main effects of the compounds on the characteristics of the composition will be described. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means that "a value is zero" or "a value is nearly zero."

TABLE 2

| Characteristics of Compounds | | | | | |
|---|---|---|---|---|---|
| Compounds | Compound (1) | Compound (2) | Compound (3) | Compound (4) | Compound (5) |
| Maximum temperature | M | S to M | S to L | S to L | S to L |
| Viscosity | L | S | S to M | M to L | M to L |
| Optical anisotropy | L | S | S to L | M to L | M to L |
| Dielectric anisotropy | L | 0 | 0 | S to L | M to L[1)] |
| Specific resistance | L | L | L | L | L |

[1)]A value of dielectric anisotropy is negative, and the symbol shows magnitude of an absolute value.

Upon mixing the component compounds with the composition, the main effects of the component compounds on the characteristics of the composition are as described below. Compound (1) increases the dielectric anisotropy. Compound (2) decreases the viscosity. Compound (3) increases the maximum temperature, or decreases the minimum temperature. Compound (4) decreases the minimum temperature, and increases the dielectric anisotropy. Compound (5) increases a dielectric constant in a minor axis direction.

Third, the combination of components in the composition, the preferred proportion of the component compounds and the basis thereof will be described. A preferred combination of components in the composition includes a combination of the first component and the second component, a combination of the first component, the second component and the third component, a combination of the first component, the second component and the fourth component, a combination of the first component, the second component and the fifth component, a combination of the first component, the second component, the third component and the fourth component, a combination of the first component, the second component, the third component and the fifth component, a combination of the first component, the second component, the fourth component and the fifth component, or a combination of the first component, the second component, the third component, the fourth component and the fifth component. A further preferred combination includes the combination of the first component, the second component, the third component and the fourth component.

A preferred proportion of the first component is about 5% by weight or more for increasing the dielectric anisotropy, and about 40% by weight or less for decreasing the minimum temperature. A further preferred proportion is in the range of about 5% by weight to about 30% by weight. A particularly preferred proportion is in the range of about 5% by weight to about 25% by weight.

A preferred proportion of the second component is about 10% by weight or more for decreasing the viscosity, and about 70% by weight or less for increasing the dielectric anisotropy. A further preferred proportion is in the range of about 10% by weight to about 60% by weight. A particularly preferred proportion is in the range of about 15% by weight to about 50% by weight.

A preferred proportion of the third component is about 10% by weight or more for increasing the maximum temperature or decreasing the minimum temperature, and about 80% by weight or less for increasing the dielectric anisotropy. A further preferred proportion is in the range of about 15% by weight to about 75% by weight. A particularly preferred proportion is in the range of about 20% by weight to about 70% by weight.

A preferred proportion of the fourth component is about 3% by weight or more for increasing the dielectric anisotropy, and about 40% by weight or less for decreasing the minimum temperature. A further preferred proportion is in the range of about 3% by weight to about 35% by weight. A particularly preferred proportion is in the range of about 3% by weight to about 30% by weight.

A preferred proportion of the fifth component is about 3% by weight or more for increasing the dielectric anisotropy in the minor axis direction, and about 30% by weight or less for decreasing the minimum temperature. A further preferred proportion is in the range of about 3% by weight to about 20% by weight. A particularly preferred proportion is in the range of about 3% by weight to about 10% by weight.

Fourth, the preferred embodiment of the component compounds will be described. In formula (1), formula (2), formula (3), formula (4) and formula (5), $R^1$ and $R^6$ are independently alkyl having 1 to 12 carbons, alkoxy having 1 to 12 carbons or alkenyl having 2 to 12 carbons. Preferred $R^1$ or $R^6$ is alkyl having 1 to 12 carbons for increasing the stability to ultraviolet light or heat. $R^2$ and $R^3$ are independently alkenyl having 2 to 12 carbons. $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine. Preferred $R^4$ is alkyl having 1 to 12 carbons for increasing the stability to ultraviolet light or heat, and alkenyl having 2 to 12 carbons for decreasing the minimum temperature. $R^5$ is alkyl having 1 to 12 carbons or alkoxy having 1 to 12 carbons. Preferred $R^5$ is alkyl having 1 to 12 carbons for increasing the stability to ultraviolet light or heat, for instance. $R^7$ and $R^8$ are independently alkyl having 1 to 12 carbons, alkoxy having 1 to 12 carbons, alkenyl having 2 to 12 carbons or alkenyloxy having 2 to 12 carbons. Preferred $R^7$ or $R^8$ is alkyl having 1 to 12 carbons for increasing the stability to ultraviolet light or heat, and alkoxy having 1 to 12 carbons for increasing the dielectric anisotropy.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH—CH— in the alkenyl depends on a position of a double bond. Trans is preferred in alkenyl such as 1-propenyl, 1-butenyl, 1-pentenyl, 1-hexenyl, 3-pentenyl and 3-hexenyl for decreasing the viscosity, for instance. Cis is preferred in alkenyl such as 2-butenyl, 2-pentenyl and 2-hexenyl. In the alkenyl, straight-chain alkenyl is preferred to branched-chain alkenyl.

Preferred alkenyloxy is vinyloxy, allyloxy, 3-butenyloxy, 3-pentenyloxy or 4-pentenyloxy. Further preferred alkenyloxy is allyloxy or 3-butenyloxy for decreasing the viscosity.

Specific examples of preferred alkyl in which at least one piece of hydrogen is replaced by fluorine or chlorine include fluoromethyl, 2-fluoroethyl, 3-fluoropropyl, 4-fluorobutyl, 5-fluoropentyl, 6-fluorohexyl, 7-fluoroheptyl or 8-fluorooctyl. Further preferred examples include 2-fluoroethyl, 3-fluoropropyl, 4-fluorobutyl or 5-fluoropentyl for increasing the dielectric anisotropy.

Specific examples of preferred alkenyl in which at least one piece of hydrogen is replaced by fluorine or chlorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Ring A and ring B are independently 1,4-cyclohexylene, 1,4-phenylene, 2-fluoro-1,4-phenylene or 2,5-difluoro-1,4-phenylene. Preferred ring A or ring B is 1,4-cyclohexylene for decreasing the viscosity or increasing the maximum temperature, and 1,4-phenylene for increasing the optical anisotropy. Ring C is 1,4-cyclohexylene, 1,4-phenylene, 2-fluoro-1,4-phenylene, 2,3-difluoro-1,4-phenylene, 2,6-difluoro-1,4-phenylene, tetrahydropyran-2,5-diyl, 1,3-dioxane-2,5-diyl or pyrimidine-2,5-diyl. Preferred ring C is 1,4-phenylene or 2-fluoro-1,4-phenylene for increasing the optical anisotropy.

Ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl. Herein, specific examples of preferred 1,4-phenylene in which at least one piece of hydrogen is replaced by fluorine or chlorine include 2-fluoro-1,4-phenylene, 2,3-difluoro-1,4-phenylene or 2-chloro-3-fluoro-1,4-phenylene. Preferred ring D or ring F is 1,4-cyclohexylene for decreasing the viscosity, tetrahydropyran-2,5-diyl for increasing the dielectric anisotropy, and 1,4-phenylene for increasing the optical anisotropy. Ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Preferred ring E is 2,3-difluoro-1,4-phenylene for increasing the dielectric anisotropy. With regard to a configuration of 1,4-cyclohexylene, trans is preferred to cis for increasing the maximum temperature. Tetrahydropyran-2,5-diyl includes:

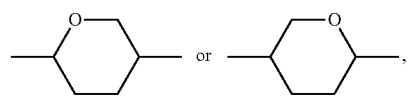

preferably

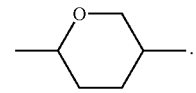

$Z^1$ is a single bond, ethylene, carbonyloxy or methyleneoxy. Preferred $Z^1$ is a single bond for decreasing the viscosity, ethylene for decreasing the minimum temperature, and carbonyloxy for increasing the maximum temperature. $Z^2$ is a single bond, ethylene, carbonyloxy or difluoromethyleneoxy. Preferred $Z^2$ is a single bond for decreasing the viscosity, and difluoromethyleneoxy for increasing the dielectric anisotropy. $Z^3$ and $Z^4$ are independently a single bond, ethylene, carbonyloxy or methyleneoxy. Preferred $Z^3$ or $Z^4$ is a single bond for decreasing the viscosity, ethylene for decreasing the minimum temperature, and methyleneoxy for increasing the dielectric anisotropy.

$X^1$, $X^2$, $X^3$, $X^4$, $X^5$, $X^6$, $X^7$, $X^8$ and $X^9$ are independently hydrogen or fluorine. Preferred $X^1$, $X^2$, $X^3$, $X^4$, $X^5$, $X^6$, $X^7$, $X^8$ and $X^9$ are fluorine for increasing the dielectric anisotropy.

$Y^1$ and $Y^2$ are fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine. Preferred $Y^1$ or $Y^2$ is fluorine for decreasing the minimum temperature.

Then, a is 1, 2 or 3. Preferred a is 1 for decreasing the viscosity, and 2 or 3 for increasing the maximum temperature. Then, b is 1, 2, 3 or 4. Preferred b is 2 for decreasing the minimum temperature, and 3 for increasing the dielectric anisotropy. Then, c is 1, 2 or 3, d is 0 or 1, and a sum of c and d is 3 or less. Preferred c is 1 for decreasing the viscosity, and 2 or 3 for increasing the maximum temperature. Preferred d is 0 for decreasing the viscosity, and 1 for decreasing the minimum temperature.

Preferred compound (1) includes compound (1-1) to compound (1-4) described in item 2. In the compounds, at least one of the first components preferably includes compound (1-1) or compound (1-2). At least two of the first components preferably includes a combination of compound (1-1) and compound (1-2).

Preferred compound (3) includes compound (3-1) to compound (3-13) described in item 5. In the compounds, at least one of the third components preferably includes compound (3-1), compound (3-3), compound (3-5), compound (3-6), compound (3-8) or compound (3-13). At least two of the third components preferably includes a combination of compound (3-1) and compound (3-3), a combination of compound (3-1) and compound (3-5), a combination of compound (3-1) and compound (3-8), or a combination of compound (3-3) and compound (3-5).

Preferred compound (4) includes compound (4-1) to compound (4-33) described in item 8. In the compounds, at least one of the fourth components preferably includes compound (4-4), compound (4-12), compound (4-14), compound (4-15), compound (4-17), compound (4-18), compound (4-23), compound (4-27) or compound (4-28). At least two of the fourth components preferably includes a combination of compound (4-12) and compound (4-15), a combination of compound (4-14) and compound (4-27), or a combination of compound (4-18) and compound (4-23).

Preferred compound (5) includes compound (5-1) to compound (5-22) described in item 11. In the compounds, at least one of the fifth components preferably includes compound (5-1), compound (5-3), compound (5-4), compound (5-6), compound (5-8) or compound (5-10). At least two of the fifth components preferably includes a combination of compound (5-1) and compound (5-6), a combination of compound (5-1) and compound (5-10), a combination of compound (5-3) and compound (5-8), a combination of compound (5-4) and compound (5-6), a combination of compound (5-4) and compound (5-8), or a combination of compound (5-4) and compound (5-10).

Sixth, the additive that may be added to the composition will be described. Such an additive includes the optically active compound, the antioxidant, the ultraviolet light absorber, the dye, the antifoaming agent, the polymerizable compound, the polymerization initiator, the polymerization inhibitor and the polar compound. The optically active compound is added to the composition for the purpose of inducing a helical structure in a liquid crystal to give a twist angle. Examples of such a compound include compound (6-1) to compound (6-5). A preferred proportion of the optically active compound is about 5% by weight or less. A further preferred proportion is in the range of about 0.01% by weight to about 2% by weight.

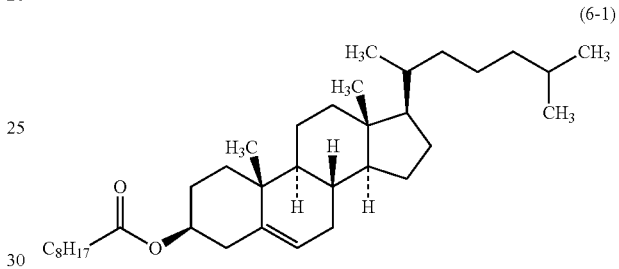

(6-1)

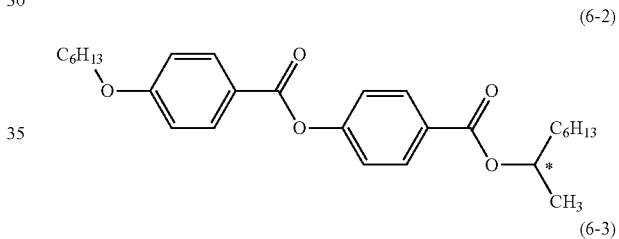

(6-2)

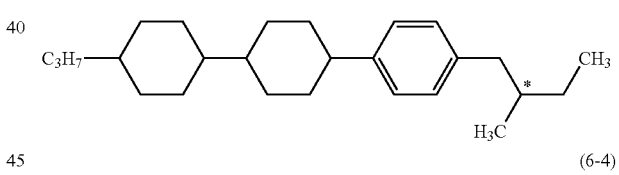

(6-3)

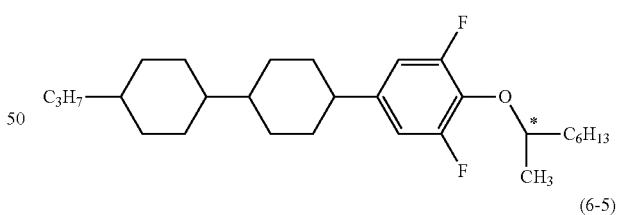

(6-4)

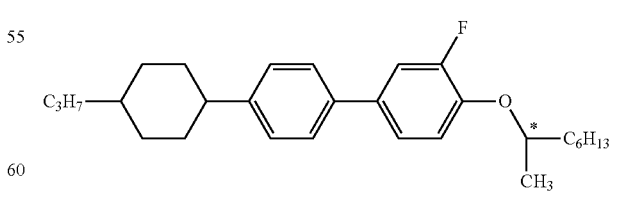

(6-5)

The antioxidant is added to the composition for preventing a decrease in the specific resistance caused by heating in air, or for maintaining a large voltage holding ratio at room temperature and also at the temperature close to the maximum temperature even after the device has been used for a long period of time. Specific examples of a preferred antioxidant include compound (7) in which t is an integer from 1 to 9.

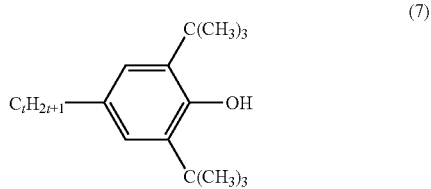

In compound (7), preferred t is 1, 3, 5, 7 or 9. Further preferred t is 7. Compound (7) in which t is 7 is effective in maintaining a large voltage holding ratio at room temperature and also at the temperature close to the maximum temperature even after the device has been used for a long period of time because such compound (7) has a small volatility. A preferred proportion of the antioxidant is about 50 ppm or more for achieving an effect thereof, and about 600 ppm or less for avoiding a decrease in the maximum temperature or an increase in the minimum temperature. A further preferred proportion is in the range of about 100 ppm to about 300 ppm.

Specific examples of a preferred ultraviolet light absorber include a benzophenone derivative, a benzoate derivative and a triazole derivative. A light stabilizer such as an amine having steric hindrance is also preferred. A preferred proportion of the absorber or the stabilizer is about 50 ppm or more for achieving an effect thereof, and about 10,000 ppm or less for avoiding the decrease in the maximum temperature or avoiding the increase in the minimum temperature. A further preferred proportion is in the range of about 100 ppm to about 10,000 ppm.

A dichroic dye such as an azo dye or an anthraquinone dye is added to the composition to be adapted for a device having a guest host (GH) mode. A preferred proportion of the dye is in the range of about 0.01% by weight to about 10% by weight. The antifoaming agent such as dimethyl silicone oil or methyl phenyl silicone oil is added to the composition for preventing foam formation. A preferred proportion of the antifoaming agent is about 1 ppm or more for achieving an effect thereof, and about 1,000 ppm or less for preventing a poor display. A further preferred proportion is in the range of about 1 ppm to about 500 ppm.

The polymerizable compound is added to the composition to be adapted for a polymer sustained alignment (PSA) mode device. Specific examples of a preferred polymerizable compound include a compound having a polymerizable group such as acrylate, methacrylate, a vinyl compound, a vinyloxy compound, propenyl ether, an epoxy compound (oxirane and oxetane) and vinyl ketone. Further preferred examples include an acrylate derivative or a methacrylate derivative. A preferred proportion of the polymerizable compound is about 0.05% by weight or more for achieving the effect thereof, and about 10% by weight or less for preventing a poor display. A further preferred proportion is in the range of about 0.1% by weight to about 2% by weight. The polymerizable compound is polymerized by irradiation with ultraviolet light. The polymerizable compound may be polymerized in the presence of an initiator such as a photopolymerization initiator. Suitable conditions for polymerization, suitable types of the initiator and suitable amounts thereof are known to those skilled in the art and are described in literature. For example, Irgacure 651 (registered trademark; BASF), Irgacure 184 (registered trademark; BASF) or Darocur 1173 (registered trademark; BASF), each being a photoinitiator, is suitable for radical polymerization. A preferred proportion of the photopolymerization initiator is in the range of about 0.1% by weight to about 5% by weight based on the weight of the polymerizable compound. A further preferred proportion is in the range of about 1% by weight to about 3% by weight.

Upon storing the polymerizable compound, the polymerization inhibitor may be added thereto for preventing polymerization. The polymerizable compound is ordinarily added to the composition without removing the polymerization inhibitor. Specific examples of the polymerization inhibitor include hydroquinone, a hydroquinone derivative such as methylhydroquinone, 4-t-butylcatechol, 4-methoxyphenol and phenothiazine.

Seventh, the methods for synthesizing the component compounds will be described. The compounds can be prepared according to known methods. Examples of the synthetic methods are described. Compound (1-1) is prepared according to a method described in JP H10-251186 A. Compound (2) is prepared according to a method described in JP S59-176221 A. Compound (3-3) is prepared according to a method described in JP S52-53783 A, Compound (4-2) and compound (4-8) are prepared according to a method described in JP H2-233626 A. Compound (5-1) and compound (5-6) are prepared according to a method described in JP H2-503441 A. The antioxidant is commercially available. A compound in which t in formula (7) is 1 is available from Sigma-Aldrich Corporation. Compound (7) in which t is 7 or the like is prepared according to a method described in U.S. Pat. No. 3,660,505 B.

Any compounds whose synthetic methods are not described above can be prepared according to methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known method using the thus obtained compounds. For example, the component compounds are mixed and dissolved in each other by heating.

Last, the application of the composition will be described. Most of the composition has the minimum temperature of about −10° C. or lower, the maximum temperature of about 70° C. or higher, the optical anisotropy in the range of about 0.07 to about 0.20, and the elastic constant of 11 pN or more. A device including the composition has the large voltage holding ratio. The composition is suitable for use in the AM device. The composition is particularly suitable for use in a transmissive AM device. The composition having optical anisotropy in the range of about 0.08 to about 0.25 and further the composition having optical anisotropy in the range of about 0.10 to about 0.30 may be prepared by controlling the proportion of the component compounds or by mixing any other liquid crystal compound. Moreover, the composition having an elastic constant of 12 pN or more, and further the composition having an elastic constant of 13 pN or more may be prepared by controlling the proportion of the component compounds or by mixing any other liquid crystal compound. A device including the composition has the large voltage holding ratio. The composition is suitable for use in the AM device. The composition is particularly suitable for use in a transmissive AM device. The composition can be used as the composition having the nematic phase, and as the optically active composition by adding the optically active compound.

The composition can be used for the AM device. The composition can also be used for a PM device. The composition can also be used for the AM device and the PM device each having a mode such as the PC mode, the TN mode, the STN mode, the ECB mode, the OCB mode, the IPS mode, the FFS mode, the VA mode and the FPA mode. Use for the AM device having the TN mode, the OCB mode, the IPS mode or the FFS mode is particularly preferred. In the AM device having the IPS mode or the FFS mode, alignment of liquid crystal molecules when no voltage is applied may be parallel or vertical to a glass substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, or for a polymer dispersed (PD) device in which a three-dimensional network-polymer is formed in the composition.

EXAMPLES

The invention will be described in greater detail by way of Examples. However, the invention is not limited by the Examples. The invention includes a mixture of a composition in Example 1 and a composition in Example 2. The invention also includes a mixture in which at least two compositions in Examples were mixed. The thus prepared compound was identified by methods such as an NMR analysis. Characteristics of the compound and the composition were measured by methods described below.

NMR analysis: For measurement, DRX-500 made by Bruker BioSpin Corporation was used. In $^1$H-NMR measurement, a sample was dissolved in a deuterated solvent such as $CDCl_3$, and measurement was carried out under conditions of room temperature, 500 MHz and 16 times of accumulation. Tetramethylsilane was used as an internal standard. In $^{19}$F-NMR measurement, $CFCl_3$ was used as an internal standard, and measurement was carried out under conditions of 24 times of accumulation. In explaining nuclear magnetic resonance spectra obtained, s, d, t, q, quin, sex and m stand for a singlet, a doublet, a triplet, a quartet, a quintet, a sextet and a multiplet, and br being broad, respectively.

Gas chromatographic analysis: For measurement, GC-14B Gas Chromatograph made by Shimadzu Corporation was used. A carrier gas was helium (2 mL per minute). A sample vaporizing chamber and a detector (FID) were set to 280° C. and 300° C., respectively. A capillary column DB-1 (length 30 m, bore 0.32 mm, film thickness 0.25 μm; dimethylpolysiloxane as a stationary liquid phase, nonpolar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample vaporizing chamber. A recorder was C-R5A Chromatopac made by Shimadzu Corporation or the equivalent thereof. The resulting gas chromatogram showed a retention time of a peak and a peak area corresponding to each of the component compounds.

As a solvent for diluting the sample, chloroform, hexane or the like may also be used. The following capillary columns may also be used for separating component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of preventing an overlap of peaks of the compounds.

A proportion of liquid crystal compounds contained in the composition may be calculated by the method as described below. The mixture of liquid crystal compounds is detected by gas chromatograph (FID). An area ratio of each peak in the gas chromatogram corresponds to the ratio (weight ratio) of the liquid crystal compounds. When the capillary column described above was used, a correction coefficient of each of the liquid crystal compounds may be regarded as 1 (one). Accordingly, the proportion (% by weight) of the liquid crystal compounds can be calculated from the area ratio of each peak.

Sample for measurement: When characteristics of a composition were measured, the composition was used as a sample as was. Upon measuring characteristics of a compound, a sample for measurement was prepared by mixing the compound (15% by weight) with a base liquid crystal (85% by weight). Values of characteristics of the compound were calculated, according to an extrapolation method, using values obtained by measurement. (Extrapolated value)={(measured value of a sample)−0.85×(measured value of a base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight:99% by weight). Values of maximum temperature, optical anisotropy, viscosity and dielectric anisotropy with regard to the compound were determined according to the extrapolation method.

A base liquid crystal described below was used. A proportion of the component compound was expressed in terms of weight percent (% by weight).

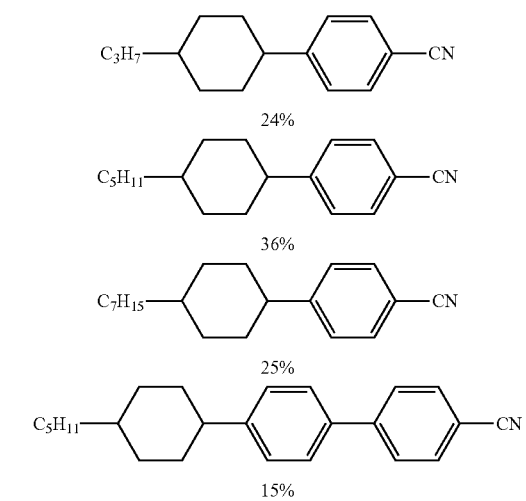

Measuring method: Characteristics were measured according to the methods described below. Most of the measuring methods are applied as described in the Standard of Japan Electronics and Information Technology Industries Association (hereinafter abbreviated as JEITA) (JEITA ED-2521B) discussed and established by JEITA, or modified thereon. No thin film transistor (TFT) was attached to a TN device used for measurement.

(1) Maximum temperature of nematic phase (NI; ° C.): A sample was placed on a hot plate in a melting point apparatus equipped with a polarizing microscope, and heated at a rate of 1° C. per minute. Temperature when part of the sample began to change from a nematic phase to an isotropic liquid was measured.

(2) Minimum temperature of nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c<−20°$ C.

(3) Viscosity (bulk viscosity; η; measured at 20° C.; mPa·s):For measurement, a cone-plate (E type) rotational viscometer made by Tokyo Keiki Inc. was used.

(4) Viscosity (rotational viscosity; yl; measured at 25° C.; mPa·s): Measurement was carried out according to a method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. Voltage was applied stepwise to the device in the range of 16 V to 19.5 V at an increment of 0.5 V. After a period of 0.2 second with no voltage application, voltage was repeatedly applied under conditions of only one rectangular wave (rectangular pulse; 0.2 second) and no voltage application (2 seconds). A peak current and a peak time of transient current generated by the applied voltage were measured. A value of rotational viscosity was obtained from the measured values and calculation equation (8) described on page 40 of the paper presented by M. Imai et al. A value of dielectric anisotropy required for the calculation was determined using the device by which the rotational viscosity was measured and by a method described below.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when a direction of polarized light was parallel to a direction of rubbing. A refractive index (n⊥) was measured when the direction of polarized light was perpendicular to the direction of rubbing. A value of optical anisotropy was calculated from an equation: Δn=n∥−n⊥.

(6) Dielectric anisotropy (As; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (ε∥) of liquid crystal molecules in a major axis direction was measured. Sine waves (0.5 V, 1 kHz) were applied to the device, and after 2 seconds, a dielectric constant (ε⊥) of liquid crystal molecules in the minor axis direction was measured. A value of dielectric anisotropy was calculated from an equation: Δε=ε∥−ε⊥.

(7) Frequency dependence (Δε (5 kHz)/Δε (50 Hz); measured at −20° C.) of dielectric anisotropy: A sample was put in a normally white mode TN device in which a distance (cell gap) between two glass substrates was 0.5/Δn (μm) and a twist angle was 80 degrees. An is a value of optical anisotropy measured according to the method described above. The device was cooled down to −20° C., 10 V in sine waves of 5 kHz was applied to the device, and then a dielectric constant (ε∥) of liquid crystal molecules in a major axis direction was measured. Then, 0.5 V in sine waves of 5 kHz was applied to the device, and a dielectric constant (ε⊥) of liquid crystal molecules in the minor axis direction was measured. A value of dielectric anisotropy (Δε (5 kHz)) was calculated from an equation: Δε=ε∥−ε⊥. Next, sine waves of 50 Hz were applied to the device, and a value of dielectric anisotropy (Δε(50 Hz)) was determined in a similar manner. Frequency dependence was calculated from a ratio of the values. When the ratio is near 1, the frequency dependence is small, more specifically, the frequency dependence is excellent. Frequency dependence of dielectric anisotropy may be occasionally abbreviated as "frequency dependence."

(8) Threshold voltage (Vth; measured at 25° C.; V): For measurement, an LCD-5100 luminance meter made by Otsuka Electronics Co., Ltd. was used. Alight source was a halogen lamp. A sample was put in a normally white mode TN device in which a distance (cell gap) between two glass substrates was 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and an amount of light transmitted through the device was measured. A voltage-transmittance curve was prepared, in which the maximum amount of light corresponds to 100% transmittance and the minimum amount of light corresponds to 0% transmittance. A threshold voltage is expressed in terms of a voltage at 90% transmittance.

(9) Voltage holding ratio (VHR-1; measured at 25° C.; %): A TN device used for measurement had a polyimide alignment film and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is expressed in terms of a percentage of area A to area B.

(10) Voltage holding ratio (VHR-2; measured at 80° C.; %): A voltage holding ratio was measured according to procedures identical with the procedures described above except that measurement was carried out at 80° C. in place of 25° C. The thus obtained value was expressed in terms of VHR-2.

(11) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and the device was irradiated with light for 20 minutes. A light source was an ultra high-pressure mercury lamp USH-500D (made by Ushio, Inc.), and a distance between the device and the light source was 20 centimeters. In measurement of VHR-3, a decaying voltage was measured for 16.7 milliseconds. A composition having large VHR-3 has large stability to ultraviolet light. A value of VHR-3 is preferably 90% or more, and further preferably, 95% or more.

(12) Voltage holding ratio (VHR-4; measured at 25° C.; %): Stability to heat was evaluated by measuring a voltage holding ratio after a TN device into which a sample was injected was heated in a constant-temperature bath at 80° C. for 500 hours. In measurement of VHR-4, a decaying voltage was measured for 16.7 milliseconds. A composition having large VHR-4 has large stability to heat.

(13) Response time (τ; measured at 25° C.; ms): For measurement, an LCD-5100 luminance meter made by Otsuka Electronics Co., Ltd. was used. A light source was a halogen lamp. A low-pass filter was set at 5 kHz. A sample was put in a normally white mode TN device in which a distance (cell gap) between two glass substrates was 5.0 micrometers and a twist angle was 80 degrees. A voltage (rectangular waves; 60 Hz, 5 V, 0.5 second) was applied to the device. On the occasion, the device was irradiated with light from a direction perpendicular to the device, and an amount of light transmitted through the device was measured. The maximum amount of light corresponds to 100% transmittance, and the minimum amount of light corresponds to 0% transmittance. A rise time (Tr; millisecond) was expressed in terms of time required for a change from 90% transmittance to 10% transmittance. A fall time (if; millisecond) was expressed in teLLus of time required for a change from 10% transmittance to 90% transmittance. A response time was expressed by a sum of the rise time and the fall time thus obtained.

(14) Elastic constant (K; measured at 25° C.; pN): For measurement, HP4284A LCR Meter made by Yokogawa-Hewlett-Packard Co. was used. A sample was put in a horizontal alignment device in which a distance (cell gap) between two glass substrates was 20 micrometers. An electric charge of 0 V to 20 V was applied to the device, and electrostatic capacity and applied voltage were measured. The measured values of electrostatic capacity (C) and applied voltage (V) were fitted to equation (2.98) and equation (2.101) on page 75 of "Liquid Crystal Device Handbook" (Ekisho Debaisu Handobukku in Japanese; Nikkan Kogyo Shimbun, Ltd.) and values of K11 and K33 were obtained from equation (2.99). Next, K22 was calculated using the previously determined values of K11 and K33 in equation (3.18) on page 171. Elastic constant K was expressed in terms of a mean value of the thus determined K11, K22 and K33.

(15) Specific resistance (ρ; measured at 25° C.; cm): Into a vessel equipped with electrodes, 1.0 milliliter of sample was injected. A direct current voltage (10 V) was applied to the vessel, and a direct current after 10 seconds was measured. Specific resistance was calculated from the following equation: (specific resistance)={(voltage)×(electric capacity of a vessel)}/{(direct current)×(dielectric constant of vacuum)}.

(16) Helical pitch (P; measured at room temperature; μm): A helical pitch was measured according to a wedge method. Refer to page 196 in "Handbook of Liquid Crystals (Ekisho Binran in Japanese)" (issued in 2000, Maruzen Co., Ltd.). A sample was injected into a wedge cell and left to stand at room temperature for 2 hours, and then a gap (d2−d1) between disclination lines was observed with a polarizing microscope (trade name: MM40/60 Series, Nikon Corporation). A helical pitch (P) was calculated according to the following equation in which an angle of the wedge cell was expressed as θ:P=2×(d2−d1)×tan θ.

(17) Dielectric constant (ε⊥; measured at 25° C.) in minor axis direction: A sample was put in a TN device in which a distance (cell gap) between two glass substrates was 9 micrometers and a twist angle was 80 degrees. Sine waves (0.5 V, 1 kHz) were applied to the device, and after 2 seconds, a dielectric constant (ε⊥) of liquid crystal molecules in the minor axis direction was measured.

The compounds in Examples were represented using symbols according to definitions in Table 3 described below. In Table 3, the configuration of 1,4-cyclohexylene is trans. A parenthesized number next to a symbolized compound corresponds to the number of the compound. A symbol (−) means any other liquid crystal compound. A proportion (percentage) of the liquid crystal compound is expressed in terms of weight percent (% by weight) based on the weight of the liquid crystal composition. Values of the characteristics of the composition were summarized in the last part.

TABLE 3

| Method for Description of Compounds using Symbols R—(A$_1$)—Z$_1$— . . . —Z$_n$—(A$_n$)—R' | |
|---|---|
| 1) Left-terminal Group R— | Symbol |
| C$_n$H$_{2n+1}$— | n- |
| C$_n$H$_{2n+1}$O— | nO- |
| C$_m$H$_{2m+1}$OC$_n$H$_{2n}$— | mOn— |
| CH$_2$=CH— | V— |
| C$_n$H$_{2n+1}$—CH=CH— | nV— |
| CH$_2$=CH—C$_n$H$_{2n}$— | Vn— |
| C$_m$H$_{2m+1}$—CH=CH—C$_n$H$_{2n}$— | mVn— |
| CF$_2$=CH— | VFF— |
| CF$_2$=CH—C$_n$H$_{2n}$— | VFFn— |
| 2) Right-terminal Group —R' | Symbol |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |
| —C$_n$H$_{2n}$—CH=CH$_2$ | —nV |
| —C$_n$H$_{2n}$—CH=CH—C$_m$H$_{2m+1}$ | —nVm |
| —CH=CF$_2$ | —VFF |
| —COOCH$_3$ | —EMe |
| —F | —F |
| —Cl | —CL |
| —OCF$_3$ | —OCF3 |
| —CF$_3$ | —CF3 |
| —CN | —C |
| —CF=CH—CF$_3$ | —FVCF3 |
| 3) Bonding Group —Z$_n$— | Symbol |
| —C$_2$H$_4$— | 2 |
| —COO— | E |
| —CH=CH— | V |
| —C≡C— | T |
| —CF$_2$O— | X |
| —OCF$_2$— | x |
| —CH$_2$O— | 1O |
| 4) Ring Structure —A$_n$— | Symbol |
|  | H |
| 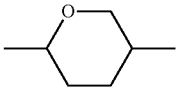 | Dh |
| 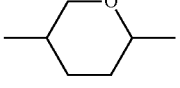 | dh |
| 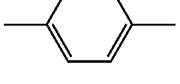 | B |

TABLE 3-continued

Method for Description of Compounds using Symbols
R—(A$_1$)—Z$_1$— ... —Z$_n$—(A$_n$)—R'

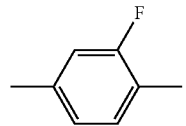 B(F)

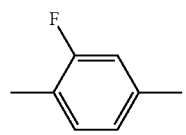 B(2F)

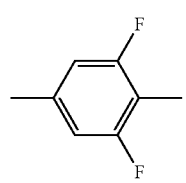 B(F,F)

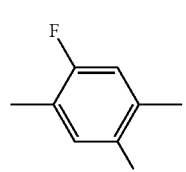 B(2F,5F)

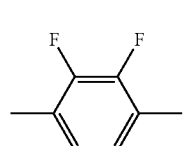 B(2F,3F)

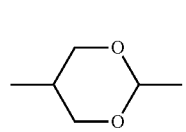 G

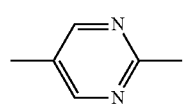 Py

5) Examples of Description

Example 1  3-BB(F)B(F,F)XB(F,F)-F

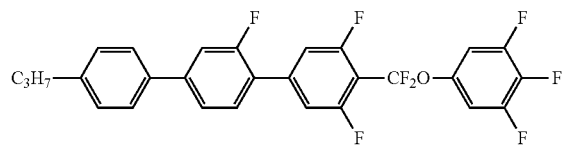

Example 2  V-HH-V1

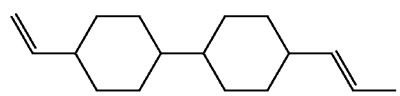

Example 3  3-HB(F)B(F,F)-F

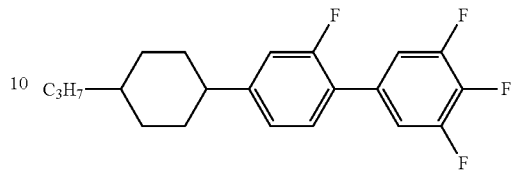

Example 4  3-HBB(2F,3F)-O2

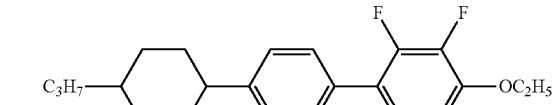

Comparative Example 1

Example 4 was selected from the compositions disclosed in JP 2009-185285 A. The basis thereof is that the composition contains compound (1-1), and the rotational viscosity (γ1) is the smallest. Components and characteristics of the composition were as described below. The elastic constant (K) and the bulk viscosity (η) were not described therein, and therefore the composition was prepared, and measured according to the methods described above.

| 3-HBB(F)B(F,F)-OCF3 | (4) | 5% |
| --- | --- | --- |
| 3-BB(F)B(F,F)XB(F,F)-F | (1-1) | 6.5% |
| 3-dhBB(F,F)XB(F,F)-F | (4-25) | 4% |
| 3-BB(F)B(F,F)-F | (4-15) | 8.5% |
| V-HH-3 | (3-1) | 53% |
| 3-BB(2F)B-2 | (3-8) | 6% |
| 4-BB(2F)B-2 | (3-8) | 7% |
| 5-BB(2F)B-2 | (3-8) | 10% |

NI = 75.0° C.; Δn = 0.128; Δε = 5.2; Vth = 1.81 V; γ1 = 55 mPa·s; K = 9.7 pN; η = 13.7 mPa·s; K/η = 0.71 nN/Pa·s (nm$^2$/s).

Comparative Example 2

Example 10 was selected from the compositions disclosed in WO 2011/65299 A. The basis thereof is that the composition contains compound (1-1), and the bulk viscosity (η) is the smallest. Components and characteristics of the composition were as described below. The elastic constant (K) was not described therein, and therefore the composition was prepared, and measured according to the methods described above.

| 3-BB(F)B(F,F)XB(F,F)-F | (1-1) | 3% |
| --- | --- | --- |
| 4-BB(F)B(F,F)XB(F,F)-F | (1-1) | 7% |
| 5-BB(F)B(F,F)XB(F,F)-F | (1-1) | 4% |
| V-HH-3 | (3-1) | 26% |
| 3-HHB-1 | (3-5) | 4% |
| 3-HHB-3 | (3-5) | 4% |
| 3-HHXB(F,F)-F | (4-4) | 10% |
| 3-BB(F,F)XB(F,F)-F | (4-18) | 18% |
| 3-HHEB(F,F)-F | (4-3) | 4% |
| 3-HBEB(F,F)-F | (4-10) | 3% |
| 5-HBEB(F,F)-F | (4-10) | 3% |
| 3-HBBXB(F,F)-F | (4-23) | 4% |

-continued

| | | |
|---|---|---|
| 3-HBB(F,F)XB(F,F)-F | (4-24) | 4% |
| 5-HBB(F)B(F,F)XB(F,F)-F | (4) | 3% |
| 5-HB(F)B(F,F)XB(F)B(F,F)-F | (4) | 3% |

NI = 80.4° C.; Tc < −20° C.; η = 22.7 mPa · s; Δn = 0.114; Δε = 14.3; Vth = 1.07 V; τ = 20.8 ms; K = 10.8 pN; K/η = 0.48 nN/Pa · s (nm²/s).

Example 1

| | | |
|---|---|---|
| 3-BB(F)B(F,F)XB(F,F)-F | (1-1) | 2% |
| 4-BB(F)B(F,F)XB(F,F)-F | (1-1) | 7% |
| 5-BB(F)B(F,F)XB(F,F)-F | (1-1) | 4% |
| V-HH-V1 | (2) | 30% |
| V-HH-3 | (3-1) | 24% |
| 1V-HH-3 | (3-1) | 8% |
| 1V2-HH-3 | (3-1) | 6% |
| V-HHB-1 | (3-5) | 2% |
| V2-HHB-1 | (3-5) | 4% |
| 3-BB(2F)B-2 | (3-8) | 7% |
| 3-HBBXB(F,F)-F | (4-23) | 6% |

NI = 79.9° C.; Tc < −20° C.; η = 9.4 mPa · s; Δn = 0.100; Δε = 3.1; Vth = 2.28 V; γ1 = 46.1 mPa · s; K = 14.1 pN; K/η = 1.50 nN/Pa · s (nm²/s); Δε (5 kHz)/Δε (50 Hz) = 0.57.

Example 2

| | | |
|---|---|---|
| 2-BB(F)B(F,F)XB(F)-F | (1-2) | 4% |
| 3-BB(F)B(F,F)XB(F)-F | (1-2) | 8% |
| 5-BBB(F,F)XB(F,F)-F | (1-4) | 3% |
| V-HH-2V | (2) | 25% |
| V2-HH-2V | (2) | 10% |
| V-HH-3 | (3-1) | 18% |
| V-HH-5 | (3-1) | 3% |
| V2-HHB-1 | (3-5) | 6% |
| 1V-HBB-2 | (3-6) | 5% |
| V2-BB(2F)B-3 | (3-8) | 3% |
| 3-HHEBH-5 | (3-11) | 3% |
| 3-BBXB(F,F)-F | (4-17) | 4% |
| 3-BB(F)XB(F,F)-F | (4-18) | 3% |
| 3-B(2F,3F)BXB(F,F)-F | (4-31) | 3% |
| 3-BB(2F,3F)BXB(F,F)-F | (4-33) | 2% |

NI = 81.7° C.; Tc < −20° C.; η = 14.8 mPa · s; Δn = 0.109; Δε = 4.7; Vth = 2.12 V; γ1 = 72.5 mPa · s; K = 14.2 pN; K/η = 0.96 nN/Pa · s (nm²/s); Δε (5 kHz)/Δε (50 Hz) = 0.55.

Example 3

| | | |
|---|---|---|
| 3-BB(F)B(F,F)XB(F,F)-F | (1-1) | 3% |
| 4-BB(F)B(F,F)XB(F,F)-F | (1-1) | 3% |
| 2-BB(F)B(F,F)XB(F)-F | (1-2) | 3% |
| 3-BB(F)B(F,F)XB(F)-F | (1-2) | 4% |
| V-HH-V | (2) | 10% |
| V-HH-V1 | (2) | 24% |
| 1V2-HH-2V1 | (2) | 4% |
| V-HH-3 | (3-1) | 15% |
| V-HH-5 | (3-1) | 6% |
| V2-HHB-1 | (3-5) | 6% |
| 1V-HBB-2 | (3-6) | 3% |
| V2-BB(2F)B-3 | (3-8) | 4% |
| 3-HHEBH-5 | (3-11) | 3% |
| 2-GB(F,F)XB(F,F)-F | (4-14) | 3% |
| 3-BB(F)B(F,F)-CF3 | (4-16) | 3% |
| V2-B(2F,3F)BXB(F,F)-F | (4-31) | 3% |
| 3-HB(2F,3F)BXB(F,F)-F | (4-32) | 3% |

NI = 77.6° C.; Tc < −20° C.; η = 13.9 mPa · s; Δn = 0.103; Δε = 5.1; Vth = 2.08 V; γ1 = 68.4 mPa · s; K = 13.8 pN; K/η = 0.99 nN/Pa · s (nm²/s); Δε (5 kHz)/Δε (50 Hz) = 0.53.

Example 4

| | | |
|---|---|---|
| 3-BB(F)B(F,F)XB(F,F)-F | (1-1) | 3% |
| 4-BB(F)B(F,F)XB(F,F)-F | (1-1) | 5% |
| 5-BB(F)B(F,F)XB(F,F)-F | (1-1) | 5% |
| V-HH-2V | (2) | 20% |
| V-HH-2V1 | (2) | 5% |
| V2-HH-2V | (2) | 10% |
| 2-HH-3 | (3-1) | 14% |
| V-HH-3 | (3-1) | 15% |
| V-HHB-1 | (3-5) | 5% |
| V2-BB(2F)B-1 | (3-8) | 5% |
| 5-HBB(F)B-3 | (3-13) | 4% |
| 2-BB(F)B(F,F)-F | (4-15) | 3% |
| 3-BB(F)B(F,F)-F | (4-15) | 3% |
| 5-BB(F)B(F,F)XB(F)B(F,F)-F | (4-29) | 3% |

NI = 75.8° C.; Tc < −20° C.; η = 13.4 mPa · s; Δn = 0.107; Δε = 4.2; Vth = 2.19 V; γ1 = 65.7 mPa · s; K = 13.5 pN; K/η = 1.01 nN/Pa · s (nm²/s); Δε (5 kHz)/Δε (50 Hz) = 0.55.

Example 5

| | | |
|---|---|---|
| 3-BB(F)B(F,F)XB(F,F)-F | (1-1) | 3% |
| 4-BB(F)B(F,F)XB(F,F)-F | (1-1) | 4% |
| 5-BB(F)B(F,F)XB(F,F)-F | (1-1) | 3% |
| 3-BB(F)B(F,F)XB(F)-F | (1-2) | 6% |
| V-HH-V | (2) | 12% |
| V-HH-2V | (2) | 8% |
| 1V-HH-V1 | (2) | 11% |
| V2-HH-2V1 | (2) | 5% |
| V-HH-3 | (3-1) | 25% |
| V-HHB-1 | (3-5) | 3% |
| V2-HHB-1 | (3-5) | 5% |
| V2-BB(2F)B-1 | (3-8) | 3% |
| 5-HBB(F)B-3 | (3-13) | 3% |
| 3-GB(F,F)XB(F)-F | (4-13) | 3% |
| 3-GB(F,F)XB(F,F)-F | (4-14) | 3% |
| 3-BB(F,F)XB(F)B(F,F)-F | (4-28) | 3% |

NI = 75.6° C.; Tc < −20° C.; η = 13.6 mPa · s; Δn = 0.103; Δε = 5.1; Vth = 2.09 V; γ1 = 66.9 mPa · s; K = 13.5 pN; K/η = 0.99 nN/Pa · s (nm²/s); Δε (5 kHz)/Δε (50 Hz) = 0.53.

Example 6

| | | |
|---|---|---|
| 5-BB(F)B(F,F)XB(F,F)-F | (1-1) | 3% |
| 2-BB(F)B(F,F)XB(F)-F | (1-2) | 5% |
| 3-BB(F)B(F,F)XB(F)-F | (1-2) | 7% |
| V-HH-V | (2) | 17% |
| 1V-HH-V1 | (2) | 10% |
| 1V2-HH-2V1 | (2) | 3% |
| 2-HH-3 | (3-1) | 22% |
| V-HH-3 | (3-1) | 5% |
| 1V2-HH-3 | (3-1) | 3% |
| 1-BB-3 | (3-3) | 3% |
| V2-HHB-1 | (3-5) | 3% |
| 3-HBB-2 | (3-6) | 3% |
| V-HBB-2 | (3-6) | 3% |
| V2-BB(2F)B-3 | (3-8) | 4% |
| 1-HHB(F,F)-F | (4-2) | 3% |
| 5-GB(F)B(F)B(F,F)-F | (4) | 3% |
| 3-GB(F)B(F,F)XB(F,F)-F | (4-27) | 3% |

NI = 70.9° C.; Tc < −20° C.; η = 12.7 mPa · s; Δn = 0.101; Δε = 4.2; Vth = 2.19 V; γ1 = 62.5 mPa · s; K = 13.0 pN; K/η = 1.02 nN/Pa · s (nm²/s); Δε (5 kHz)/Δε (50 Hz) = 0.55.

Example 7

| | | |
|---|---|---|
| 3-BB(F)B(F,F)XB(F)-F | (1-2) | 10% |
| 4-BB(F)B(F,F)XB(F)-F | (1-2) | 3% |
| 3-BBB(F,F)XB(F,F)-F | (1-4) | 3% |
| V-HH-V | (2) | 10% |
| V-HH-2V | (2) | 10% |
| 1V-HH-2V | (2) | 8% |
| V-HH-3 | (3-1) | 18% |
| 1V-HH-3 | (3-1) | 6% |
| 1-BB-5 | (3-3) | 9% |
| 3-HHB-3 | (3-5) | 5% |
| V2-HHB-1 | (3-5) | 6% |
| 3-BB(2F)B-2 | (3-8) | 3% |
| V-HB(F)B(F,F)-F | (4-9) | 3% |
| 3-HBEB(F,F)-F | (4-10) | 3% |
| 5-GB(F)B(F,F)XB(F)-F | (4-26) | 3% |

NI = 71.0° C.; Tc < −20° C.; $\eta$ = 14.2 mPa · s; $\Delta n$ = 0.109; $\Delta \varepsilon$ = 3.8; Vth = 2.24 V; $\gamma 1$ = 68.0 mPa · s; K = 13.0 pN; K/$\eta$ = 0.92 nN/Pa · s (nm$^2$/s); $\Delta \varepsilon$ (5 kHz)/$\Delta \varepsilon$ (50 Hz) = 0.56.

Example 8

| | | |
|---|---|---|
| 2-BB(F)B(F,F)XB(F)-F | (1-2) | 5% |
| 3-BB(F)B(F,F)XB(F)-F | (1-2) | 4% |
| 5-BB(F)B(F,F)XB(F)-OCF3 | (1-3) | 3% |
| V-HH-V | (2) | 20% |
| V-HH-V1 | (2) | 7% |
| 3-HH-5 | (3-1) | 5% |
| V-HH-3 | (3-1) | 25% |
| 1V2-HH-3 | (3-1) | 3% |
| V2-HHB-1 | (3-5) | 5% |
| 5-BB(2F)B-2 | (3-8) | 3% |
| V2-BB(2F)B-2 | (3-8) | 5% |
| 3-HHEBH-3 | (3-11) | 3% |
| 5-HB(F)B(F,F)-F | (4-9) | 3% |
| 2-HBEB(F,F)-F | (4-10) | 3% |
| 3-dhBB(F,F)XB(F,F)-F | (4-25) | 3% |
| 3-GB(F)B(F,F)XB(F)-F | (4-26) | 3% |

NI = 76.5° C.; Tc < −20° C.; $\eta$ = 14.3 mPa · s; $\Delta n$ = 0.098; $\Delta \varepsilon$ = 4.1; Vth = 2.20 V; $\gamma 1$ = 69.9 mPa · s; K = 13.7 pN; K/$\eta$ = 0.96 nN/Pa · s (nm$^2$/s); $\Delta \varepsilon$ (5 kHz)/$\Delta \varepsilon$ (50 Hz) = 0.55.

Example 9

| | | |
|---|---|---|
| 3-BB(F)B(F,F)XB(F,F)-F | (1-1) | 3% |
| 4-BB(F)B(F,F)XB(F,F)-F | (1-1) | 4% |
| 5-BB(F)B(F,F)XB(F,F)-F | (1-1) | 3% |
| 3-BB(F)B(F,F)XB(F)-F | (1-2) | 3% |
| 4-BB(F)B(F,F)XB(F)-F | (1-2) | 3% |
| V-HH-V | (2) | 11% |
| V-HH-V1 | (2) | 18% |
| 1VH-HH-2V1 | (2) | 5% |
| V-HH-3 | (3-1) | 15% |
| 1V-HH-3 | (3-1) | 8% |
| VFF-HH-3 | (3-1) | 3% |
| V-HHB-1 | (3-5) | 3% |
| V2-HHB-1 | (3-5) | 6% |
| 5-BB(2F)B-3 | (3-8) | 3% |
| 5-HBB(F)B-2 | (3-13) | 3% |
| 5-HBB(F,F)-F | (4-8) | 3% |
| 3-HB(F)B(F,F)-F | (4-9) | 3% |
| 3-HBB(F,F)XB(F,F)-F | (4-24) | 3% |

NI = 79.7° C.; Tc < −20° C.; $\eta$ = 14.7 mPa · s; $\Delta n$ = 0.104; $\Delta \varepsilon$ = 4.4; Vth = 2.17 V; $\gamma 1$ = 72.3 mPa · s; K = 14.1 pN; K/$\eta$ = 0.96 nN/Pa · s (nm$^2$/s); $\Delta \varepsilon$ (5 kHz)/$\Delta \varepsilon$ (50 Hz) = 0.60.

Example 10

| | | |
|---|---|---|
| 3-BB(F)B(F,F)XB(F,F)-F | (1-1) | 3% |
| 4-BB(F)B(F,F)XB(F,F)-F | (1-1) | 4% |
| 3-BB(F)B(F,F)XB(F)-F | (1-2) | 3% |
| V-HH-V | (2) | 15% |
| V-HH-2V1 | (2) | 13% |
| 1V-HH-2V | (2) | 8% |
| V-HH-4 | (3-1) | 15% |
| V2-BB-1 | (3-3) | 6% |
| V-HHB-1 | (3-5) | 7% |
| V2-HHB-1 | (3-5) | 5% |
| V-HBB-2 | (3-6) | 4% |
| V2-BB(2F)B-2 | (3-8) | 3% |
| V2-B2BB-1 | (3-9) | 3% |
| 3-HB(F)HH-5 | (3-10) | 2% |
| 2-HBB(F,F)-F | (4-8) | 3% |
| 3-HBB(F,F)-F | (4-8) | 3% |
| 4-GB(F)B(F,F)XB(F,F)-F | (4-27) | 3% |

NI = 77.7° C.; Tc < −20° C.; $\eta$ = 12.7 mPa · s; $\Delta n$ = 0.106; $\Delta \varepsilon$ = 3.3; Vth = 2.27 V; $\gamma 1$ = 62.1 mPa · s; K = 13.9 pN; K/$\eta$ = 1.10 nN/Pa · s (nm$^2$/s); $\Delta \varepsilon$ (5 kHz)/$\Delta \varepsilon$ (50 Hz) = 0.52.

Example 11

| | | |
|---|---|---|
| 3-BB(F)B(F,F)XB(F,F)-F | (1-1) | 3% |
| 2-BB(F)B(F,F)XB(F)-F | (1-2) | 3% |
| 3-BB(F)B(F,F)XB(F)-F | (1-2) | 3% |
| 4-BB(F)B(F,F)XB(F)-F | (1-2) | 3% |
| V-HH-V | (2) | 6% |
| V-HH-V1 | (2) | 14% |
| V-HH-2V1 | (2) | 6% |
| 2-HH-5 | (3-1) | 3% |
| V-HH-3 | (3-1) | 24% |
| 1V-HH-3 | (3-1) | 7% |
| 5-HB-O2 | (3-2) | 5% |
| 3-HHB-3 | (3-5) | 3% |
| 2-HGB(F,F)-F | (4-6) | 3% |
| 3-HGB(F,F)-F | (4-6) | 2% |
| 3-GHB(F,F)-F | (4-7) | 3% |
| 5-HBEB(F,F)-F | (4-10) | 3% |
| 3-HHBB(F,F)-F | (4-19) | 3% |
| 5-HBBXB(F,F)-F | (4-23) | 3% |
| 3-HBB(2F,3F)-O2 | (5-10) | 3% |

NI = 70.5° C.; Tc < −20° C.; $\eta$ = 14.7 mPa · s; $\Delta n$ = 0.086; $\Delta \varepsilon$ = 4.3; Vth = 2.18 V; $\gamma 1$ = 71.7 mPa · s; K = 13.0 pN; K/$\eta$ = 0.88 nN/Pa · s (nm$^2$/s); $\Delta \varepsilon$ (5 kHz)/$\Delta \varepsilon$ (50 Hz) = 0.54.

Example 12

| | | |
|---|---|---|
| 4-BB(F)B(F,F)XB(F,F)-F | (1-1) | 3% |
| 3-BB(F)B(F,F)XB(F)-F | (1-2) | 5% |
| 3-BB(F)B(F,F)XB(F)-OCF3 | (1-3) | 5% |
| 3-BBB(F,F)XB(F,F)-F | (1-4) | 4% |
| V-HH-V1 | (2) | 26% |
| V-HH-2V1 | (2) | 10% |
| V-HH-3 | (3-1) | 20% |
| 3-HHEH-3 | (3-4) | 3% |
| V-HHB-1 | (3-5) | 3% |
| V2-HHB-1 | (3-5) | 4% |
| 3-HBB-2 | (3-6) | 5% |
| V2-BB(2F)B-2 | (3-8) | 3% |
| 3-HGB(F,F)-F | (4-6) | 3% |
| 5-HGB(F,F)-F | (4-6) | 3% |
| 2-BB(F,F)XB(F,F)-F | (4-18) | 3% |

NI = 80.6° C.; Tc < −20° C.; $\eta$ = 14.5 mPa · s; $\Delta n$ = 0.103; $\Delta \varepsilon$ = 4.6; Vth = 2.14 V; $\gamma 1$ = 71.3 mPa · s; K = 14.2 pN; K/$\eta$ = 0.98 nN/Pa · s (nm$^2$/s); $\Delta \varepsilon$ (5 kHz)/$\Delta \varepsilon$ (50 Hz) = 0.59.

Example 13

| | | |
|---|---|---|
| 3-BB(F)B(F,F)XB(F)-F | (1-2) | 10% |
| V-HH-V | (2) | 10% |
| V-HH-V1 | (2) | 15% |
| 1V-HH-V1 | (2) | 10% |
| 2-HH-3 | (3-1) | 15% |
| 1V2-HH-1 | (3-1) | 3% |
| V-HHB-1 | (3-5) | 5% |
| V2-HHB-1 | (3-5) | 6% |
| V-HBB-2 | (3-6) | 6% |
| 3-BB(2F)B-2 | (3-8) | 5% |
| V2-BB2B-1 | (3) | 3% |
| 2-HGB(F,F)-F | (4-6) | 3% |
| 5-GHB(F,F)-F | (4-7) | 3% |
| 4-HHBB(F,F)-F | (4-19) | 3% |
| 3-BB(2F,3F)XB(F,F)-F | (4-30) | 3% |

NI = 79.3° C.; Tc < −20° C.; η = 13.4 mPa · s; Δn = 0.104; Δε = 3.1; Vth = 2.28 V; γ1 = 65.6 mPa · s; K = 14.0 pN; K/η = 1.05 nN/Pa · s (nm²/s); Δε (5 kHz)/Δε (50 Hz) = 0.57.

Example 14

| | | |
|---|---|---|
| 3-BB(F)B(F,F)XB(F)-F | (1-2) | 5% |
| 5-BBB(F,F)XB(F,F)-F | (1-4) | 5% |
| V-HH-V1 | (2) | 25% |
| 1V-HH-V1 | (2) | 10% |
| V-HH-3 | (3-1) | 20% |
| 1V2-HH-3 | (3-1) | 10% |
| V2-HHB-1 | (3-5) | 4% |
| VFF-HHB-1 | (3-5) | 3% |
| 5-B(F)BB-3 | (3-7) | 3% |
| 3-BB(2F)B-2 | (3-8) | 3% |
| 3-HHXB(F,F)-CF3 | (4-5) | 3% |
| 4-GHB(F,F)-F | (4-7) | 3% |
| 2-HHBB(F,F)-F | (4-19) | 3% |
| 5-GB(F)B(F,F)XB(F,F)-F | (4-27) | 3% |

NI = 83.2° C.; Tc < −20° C.; η = 14.6 mPa · s; Δn = 0.099; Δε = 3.2; Vth = 2.29 V; γ1 = 71.3 mPa · s; K = 14.6 pN; K/η = 1.00 nN/Pa · s (nm²/s); Δε (5 kHz)/Δε (50 Hz) = 0.60.

Example 15

| | | |
|---|---|---|
| 3-BB(F)B(F,F)XB(F,F)-F | (1-1) | 7% |
| 3-BBB(F,F)XB(F,F)-F | (1-4) | 3% |
| 5-BBB(F,F)XB(F,F)-F | (1-4) | 3% |
| V-HH-V | (2) | 25% |
| 1V-HH-V1 | (2) | 6% |
| 1V2-HH-2V1 | (2) | 5% |
| V-HH-3 | (3-1) | 12% |
| 1V-HH-3 | (3-1) | 7% |
| 3-HB-O2 | (3-2) | 5% |
| V-HHB-1 | (3-5) | 8% |
| V2-HHB-1 | (3-5) | 5% |
| V2-BB(2F)B-2 | (3-8) | 3% |
| V2-BB(2F)B-3 | (3-8) | 3% |
| 3-HHXB(F,F)-F | (4-4) | 5% |
| 3-HHB(F)B(F,F)-F | (4-20) | 3% |

NI = 81.0° C.; Tc < −20° C.; η = 11.9 mPa · s; Δn = 0.100; Δε = 3.2; Vth = 2.28 V; γ1 = 58.3 mPa · s; K = 14.2 pN; K/η = 1.19 nN/Pa · s (nm²/s); Δε (5 kHz)/Δε (50 Hz) = 0.58.

Example 16

| | | |
|---|---|---|
| 3-BB(F)B(F,F)XB(F,F)-F | (1-1) | 3% |
| 4-BB(F)B(F,F)XB(F,F)-F | (1-1) | 6% |
| 5-BB(F)B(F,F)XB(F,F)-F | (1-1) | 4% |
| V-HH-V1 | (2) | 18% |
| V-HH-2V1 | (2) | 12% |
| V2-HH-2V | (2) | 7% |
| V-HH-3 | (3-1) | 18% |
| 1V2-BB-1 | (3-3) | 6% |
| V-HHB-1 | (3-5) | 4% |
| V2-HHB-1 | (3-5) | 6% |
| 5-B(F)BB-2 | (3-7) | 3% |
| V2-BB(2F)B-2 | (3-8) | 4% |
| 4-HHEB(F,F)-F | (4-3) | 3% |
| 1-HHXB(F,F)-F | (4-4) | 3% |
| 4-HHB(F)B(F,F)-F | (4-20) | 3% |

NI = 80.7° C.; Tc < −20° C.; η = 13.4 mPa · s; Δn = 0.109; Δε = 3.7; Vth = 2.24 V; γ1 = 65.4 mPa · s; K = 14.2 pN; K/η = 1.06 nN/Pa · s (nm²/s); Δε (5 kHz)/Δε (50 Hz) = 0.59.

Example 17

| | | |
|---|---|---|
| 3-BB(F)B(F,F)XB(F,F)-F | (1-1) | 4% |
| 5-BB(F)B(F,F)XB(F,F)-F | (1-1) | 3% |
| 3-BBB(F,F)XB(F,F)-F | (1-4) | 5% |
| V-HH-V | (2) | 9% |
| V-HH-V1 | (2) | 10% |
| V-HH-2V1 | (2) | 10% |
| 1V-HH-2V | (2) | 3% |
| V2-HH-2V1 | (2) | 3% |
| 3-HH-4 | (3-1) | 4% |
| V-HH-3 | (3-1) | 19% |
| 7-HB-1 | (3-2) | 3% |
| 3-HHB-O1 | (3-5) | 6% |
| V-HHB-1 | (3-5) | 4% |
| 3-HBB-2 | (3-6) | 7% |
| 3-HHEB(F,F)-F | (4-3) | 3% |
| 5-HHEB(F,F)-F | (4-3) | 4% |
| 3-GB(F)B(F,F)-F | (4) | 3% |

NI = 84.1° C.; Tc < −20° C.; η = 13.5 mPa · s; Δn = 0.094; Δε = 3.0; Vth = 2.29 V; γ1 = 66.3 mPa · s; K = 14.5 pN; K/η = 1.07 nN/Pa · s (nm²/s); Δε (5 kHz)/Δε (50 Hz) = 0.60.

Example 18

| | | |
|---|---|---|
| 3-BB(F)B(F,F)XB(F,F)-F | (1-1) | 4% |
| 4-BB(F)B(F,F)XB(F,F)-F | (1-1) | 8% |
| V-HH-V | (2) | 10% |
| V-HH-V1 | (2) | 10% |
| V-HH-2V | (2) | 10% |
| 1V-HH-2V | (2) | 6% |
| V-HH-3 | (3-1) | 18% |
| 1V2-HH-3 | (3-1) | 6% |
| 2-HHB-1 | (3-5) | 3% |
| V2-HHB-1 | (3-5) | 2% |
| V-HBB-2 | (3-6) | 4% |
| 3-BB(2F)B-2 | (3-8) | 4% |
| 3-HHEBH-4 | (3-11) | 3% |
| 4-HHB(F,F)-F | (4-2) | 3% |
| 5-HHB(F,F)-F | (4-2) | 3% |
| 2-dhBB(F,F)XB(F,F)-F | (4-25) | 3% |
| 1O1-HBBH-5 | (—) | 3% |

NI = 85.1° C.; Tc < −20° C.; η = 14.2 mPa · s; Δn = 0.098; Δε = 3.1; Vth = 2.30 V; γ1 = 69.9 mPa · s; K = 14.6 pN; K/η = 1.02 nN/Pa · s (nm²/s); Δε (5 kHz)/Δε (50 Hz) = 0.63.

Example 19

| | | |
|---|---|---|
| 2-BB(F)B(F,F)XB(F)-F | (1-2) | 3% |
| 3-BB(F)B(F,F)XB(F)-F | (1-2) | 5% |
| 4-BB(F)B(F,F)XB(F)-F | (1-2) | 5% |

-continued

| | | |
|---|---|---|
| V-HH-V | (2) | 20% |
| V-HH-V1 | (2) | 5% |
| V-HH-2V1 | (2) | 10% |
| V-HH-3 | (3-1) | 15% |
| 1V-HH-3 | (3-1) | 8% |
| 3-HHB-1 | (3-5) | 3% |
| V-HHB-1 | (3-5) | 5% |
| V2-HHB-1 | (3-5) | 5% |
| 5-HB(F)BH-3 | (3-12) | 4% |
| 1-HHB(F,F)-F | (4-2) | 3% |
| 2-HHB(F,F)-F | (4-2) | 3% |
| 3-HHB(F,F)-F | (4-2) | 3% |
| 3-GBB(F)B(F,F)-F | (4-22) | 3% |

NI = 81.2° C.; Tc < −20° C.; η = 14.3 mPa · s; Δn = 0.092; Δε = 3.1; Vth = 2.29 V; γ1 = 70.0 mPa · s; K = 14.3 pN; K/η = 1.00 nN/Pa · s (nm²/s); Δε (5 kHz)/Δε (50 Hz) = 0.57.

Example 20

| | | |
|---|---|---|
| 4-BB(F)B(F,F)XB(F,F)-F | (1-1) | 5% |
| 2-BB(F)B(F,F)XB(F)-F | (1-2) | 9% |
| V-HH-V | (2) | 13% |
| V-HH-V1 | (2) | 10% |
| 1V-HH-V1 | (2) | 6% |
| 1V-HH-2V1 | (2) | 3% |
| V-HH-3 | (3-1) | 23% |
| 1V-HH-3 | (3-1) | 7% |
| 1V2-HH-3 | (3-1) | 3% |
| V-HHB-1 | (3-5) | 3% |
| V2-HHB-1 | (3-5) | 3% |
| 5-HXB(F,F)-F | (4-1) | 3% |
| 3-GB(F)B(F)-F | (4-11) | 3% |
| 3-GB(F)B(F,F)-F | (4-12) | 3% |
| 2-HHB(F)B(F,F)-F | (4-20) | 3% |
| 4-GBB(F)B(F,F)-F | (4-22) | 3% |

NI = 71.7° C.; Tc < −20° C.; η = 14.0 mPa · s; Δn = 0.091; Δε = 4.5; Vth = 2.15 V; γ1 = 68.8 mPa · s; K = 13.1 pN; K/η = 0.93 nN/Pa · s (nm²/s); Δε (5 kHz)/Δε (50 Hz) = 0.55.

The liquid crystal compositions used in the liquid crystal display devices in Examples 1 to 20 have a larger elastic constant in comparison with the compositions in Comparative Examples 1 and 2. Accordingly, the liquid crystal composition used in the liquid crystal display device of the invention is concluded to have superb characteristics.

INDUSTRIAL APPLICABILITY

A liquid crystal composition of the invention satisfies at least one of characteristics such as high maximum temperature, low minimum temperature, small viscosity, suitable optical anisotropy, large dielectric anisotropy, small frequency dependence, large specific resistance, high stability to ultraviolet light, high stability to heat and a large elastic constant, or has a suitable balance regarding at least two of the characteristics. A liquid crystal display device including the composition has a short response time, a large voltage holding ratio, a large contrast ratio, a long service life and so forth, and thus can be used for a liquid crystal projector, a liquid crystal television and so forth.

What is claimed is:

1. A liquid crystal composition that has positive dielectric anisotropy and contains at least two compounds selected from compounds represented by formula (1-1) and/or formula (1-2) as a first component, at least one compound selected from compounds represented by formula (2) as a second component, and at least one compound selected from compounds represented by formula (3-5) as a third component:

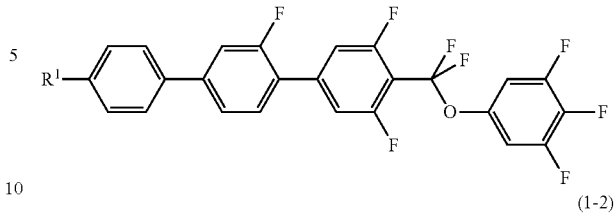

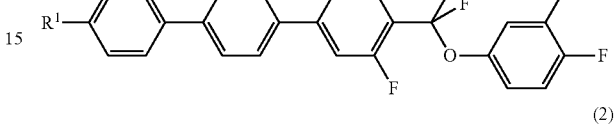

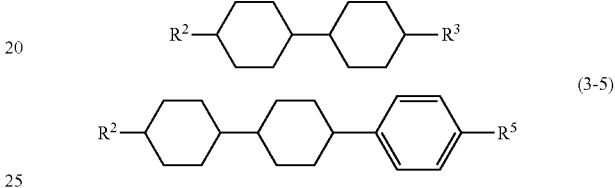

wherein, in formula (1-1), formula (1-2), formula (2) and formula (3-5), $R^1$ is alkyl having 1 to 12 carbons, alkoxy having 1 to 12 carbons or alkenyl having 2 to 12 carbons; $R^2$ and $R^3$ are independently alkenyl having 2 to 12 carbons; $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine; and $R^5$ is alkyl having 1 to 12 carbons or alkoxy having 1 to 12 carbons.

2. The liquid crystal composition according to claim 1, wherein the first component further contains at least one compound selected from the group of compounds represented by-formula (1-3) and formula (1-4):

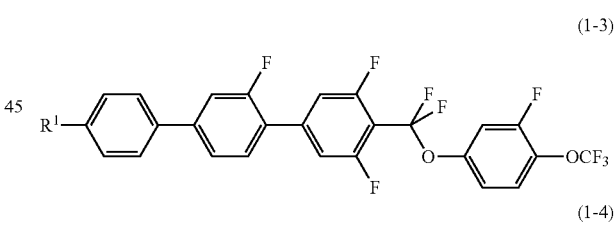

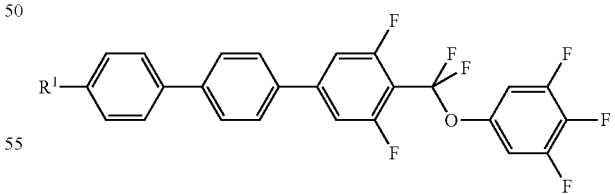

wherein, in formula (1-3) and formula (1-4), $R^1$ is alkyl having 1 to 12 carbons, alkoxy having 1 to 12 carbons or alkenyl having 2 to 12 carbons.

3. The liquid crystal composition according to claim 1, wherein a proportion of the first component is in the range of 5% by weight to 40% by weight, and a proportion of the second component is in the range of 10% by weight to 70% by weight based on the weight of the liquid crystal composition.

4. The liquid crystal composition according to claim 1, wherein the third component further contains at least one compound selected from compounds represented by formula (3) other than the compounds represented by formula (3-5):

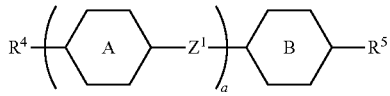
(3)

wherein, in formula (3), $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine; $R^5$ is alkyl having 1 to 12 carbons or alkoxy having 1 to 12 carbons; ring A and ring B are independently 1,4-cyclohexylene, 1,4-phenylene, 2-fluoro-1,4-phenylene or 2,5-difluoro-1,4-phenylene; $Z^1$ is a single bond, ethylene, carbonyloxy or methyleneoxy; and a is 1, 2 or 3.

5. The liquid crystal composition according to claim 4, wherein the third component further contains at least one compound selected from the group of compounds represented by formula (3-1) to formula (3-4) and formula (3-6) to formula (3-13) as the third component:

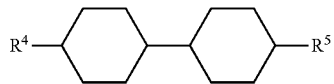
(3-1)

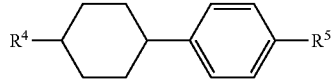
(3-2)

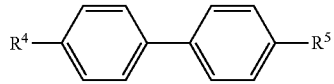
(3-3)

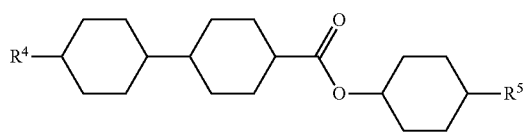
(3-4)

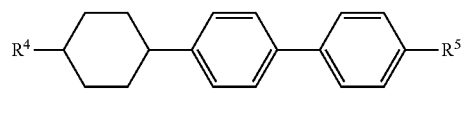
(3-6)

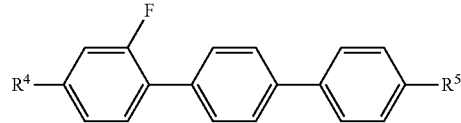
(3-7)

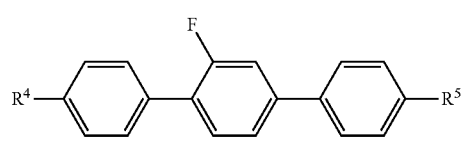
(3-8)

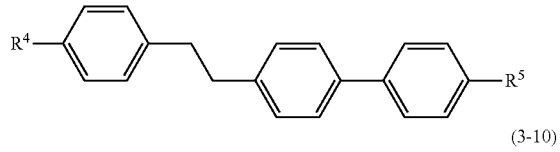
(3-9)

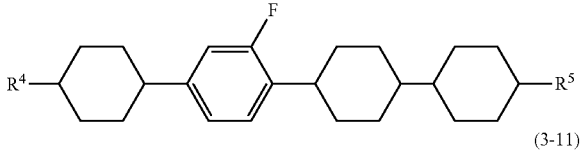
(3-10)

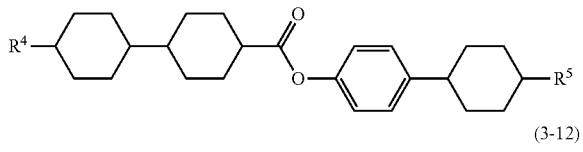
(3-11)

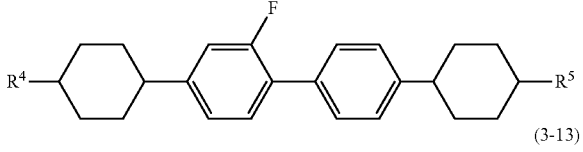
(3-12)

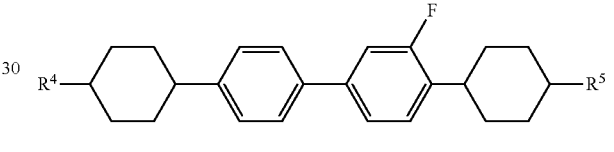
(3-13)

wherein, in formula (3-1) to formula (3-4) and formula (3-6) to formula (3-13), $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine; and $R^5$ is alkyl having 1 to 12 carbons or alkoxy having 1 to 12 carbons.

6. The liquid crystal composition according to claim 4, wherein a proportion of the third component is in the range of 10% by weight to 80% by weight based on the weight of the liquid crystal composition.

7. The liquid crystal composition according to claim 1, further containing at least one compound selected from compounds represented by formula (4) as a fourth component:

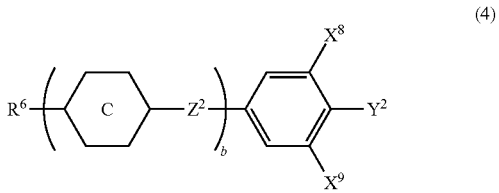
(4)

wherein, in formula (4), $R^6$ is alkyl having 1 to 12 carbons, alkoxy having 1 to 12 carbons or alkenyl having 2 to 12 carbons; ring C is 1,4-cyclohexylene, 1,4-phenylene, 2-fluoro-1,4-phenylene, 2,3-difluoro-1,4-phenylene, 2,6-difluoro-1,4-phenylene, tetrahydropyran-2,5-diyl, 1,3-dioxane-2,5-diyl or pyrimidine-2,5-diyl; $Z^2$ is a single bond, ethylene, carbonyloxy or difluoromethyleneoxy; $X^8$ and $X^9$ are independently hydrogen or fluorine; Y² is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine; and b is 1, 2, 3 or 4; in which, compounds represented by formula (1-1) and formula (1-2) are excluded.

8. The liquid crystal composition according to claim 7, containing at least one compound selected from the group of compounds represented by formula (4-1) to formula (4-33) as the fourth component:

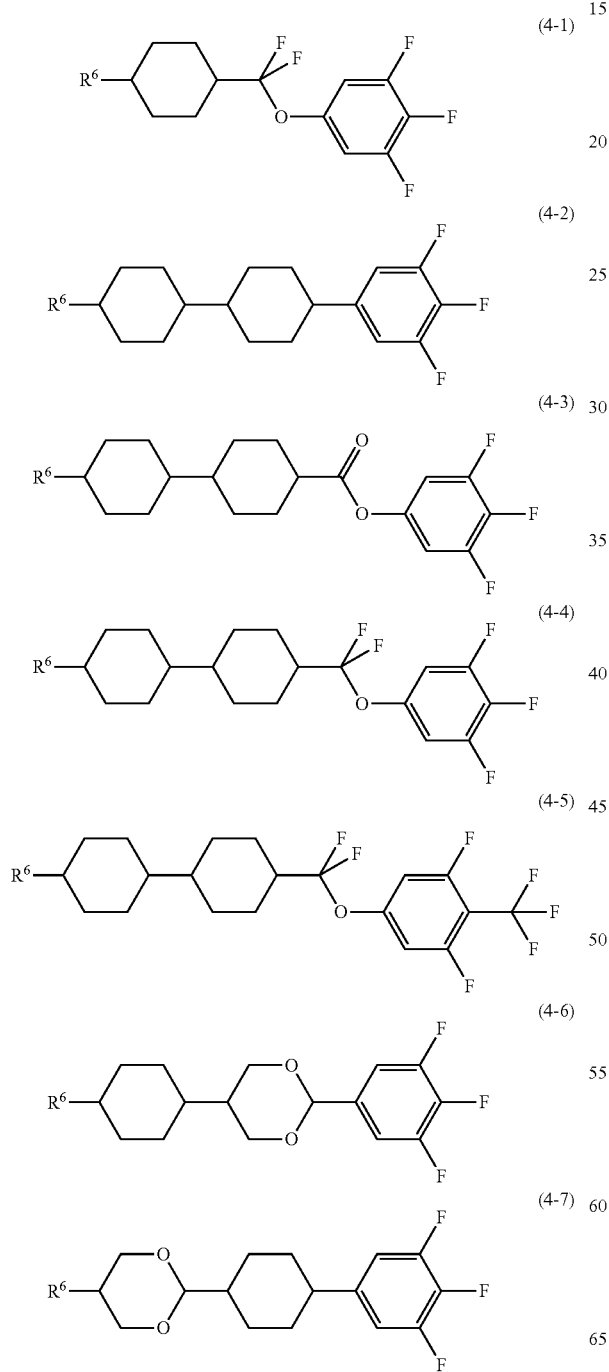

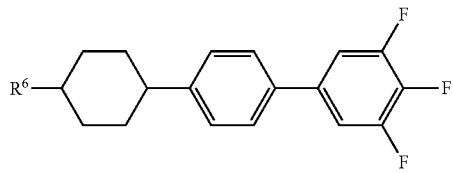

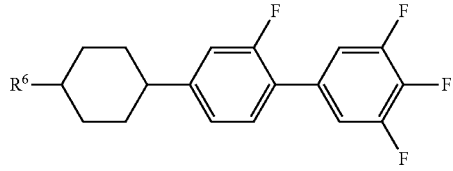

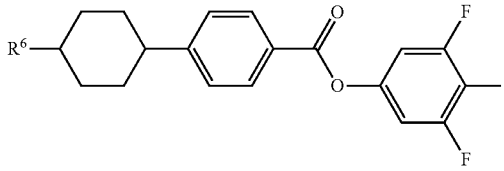

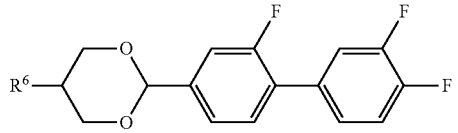

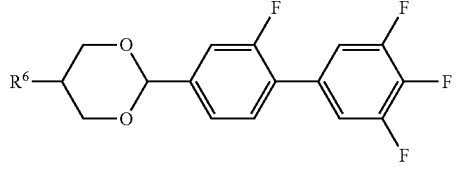

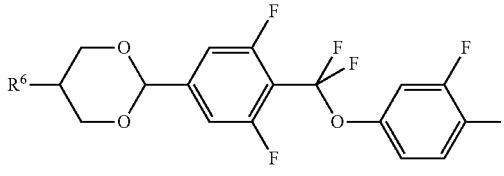

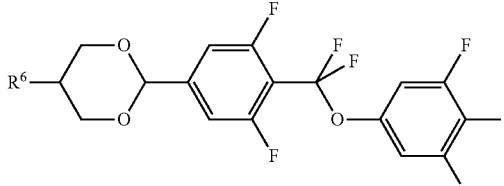

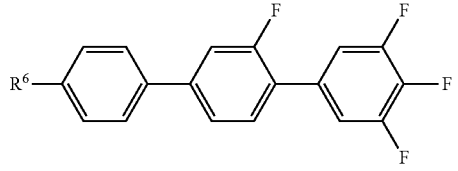

(4-16) 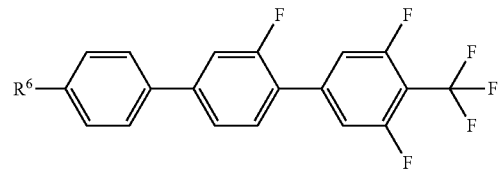
(4-17) 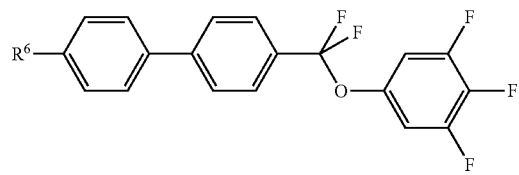
(4-18) 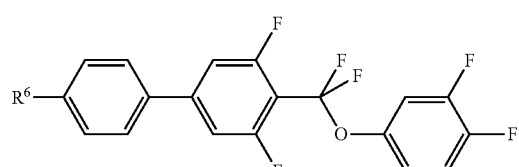
(4-19) 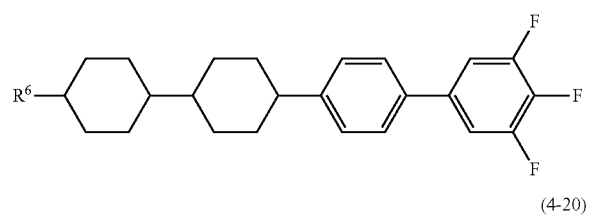
(4-20) 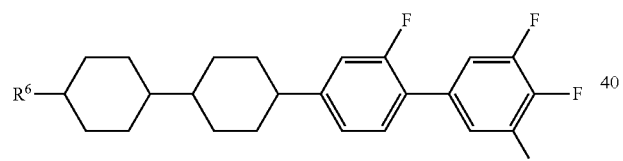
(4-21) 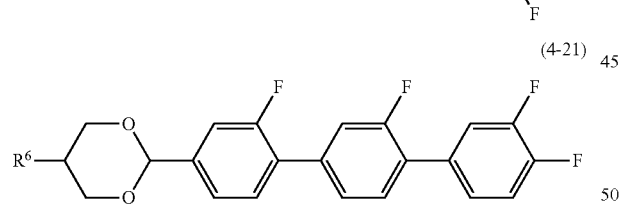
(4-22) 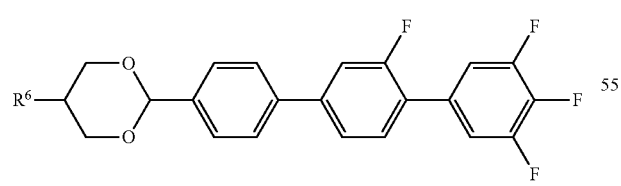
(4-23) 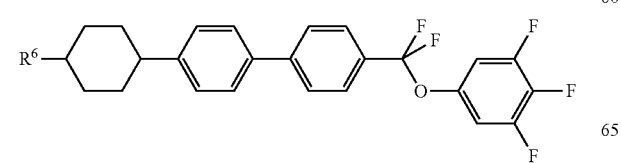
(4-24) 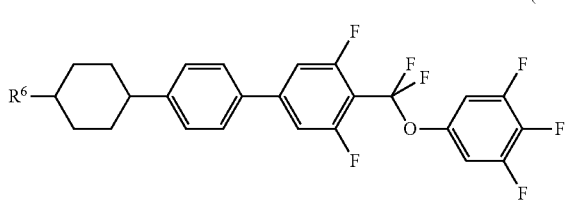
(4-25) 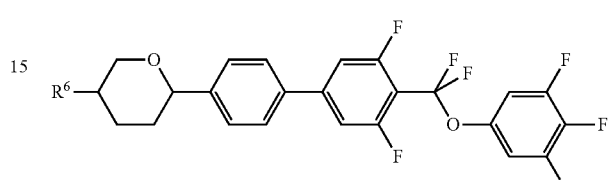
(4-26) 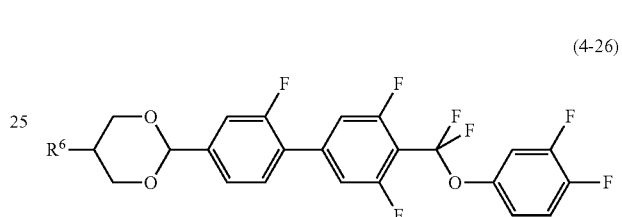
(4-27) 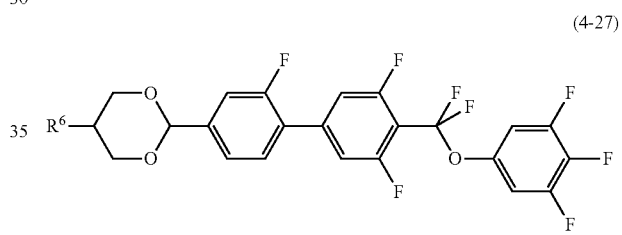
(4-28) 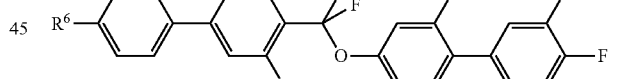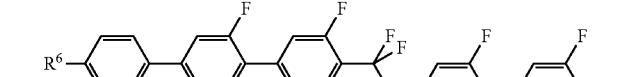
(4-29) 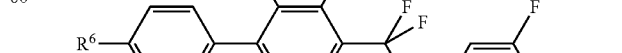
(4-30) 

-continued (4-31)
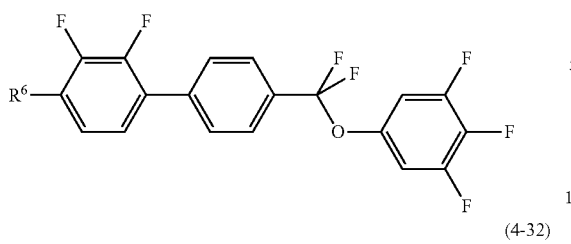

(4-32)
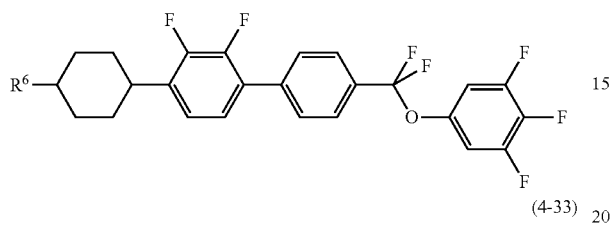

(4-33)
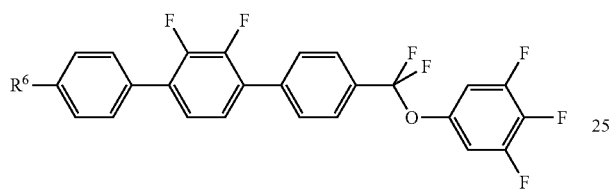

wherein, in formula (4-1) to formula (4-33), $R^6$ is alkyl having 1 to 12 carbons, alkoxy having 1 to 12 carbons or alkenyl having 2 to 12 carbons.

9. The liquid crystal composition according to claim 4, further containing at least one compound selected from compounds represented by formula (4) as a fourth component:

(4)
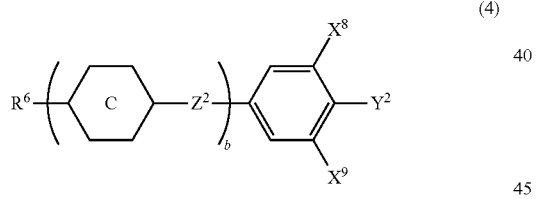

wherein, in formula (4), $R^6$ is alkyl having 1 to 12 carbons, alkoxy having 1 to 12 carbons or alkenyl having 2 to 12 carbons; ring C is 1,4-cyclohexylene, 1,4-phenylene, 2-fluoro-1,4-phenylene, 2,3-difluoro-1,4-phenylene, 2,6-difluoro-1,4-phenylene, tetrahydropyran-2,5-diyl, 1,3-dioxane-2,5-diyl or pyrimidine-2,5-diyl; $Z^2$ is a single bond, ethylene, carbonyloxy or difluoromethyleneoxy; $X^8$ and $X^9$ are independently hydrogen or fluorine; $Y^2$ is fluorine, chlorine, alkyl having 1 to 12 carbons in which at least one piece of hydrogen is replaced by fluorine or chlorine, alkoxy having 1 to 12 carbons in which at least one piece of hydrogen is replaced by fluorine or chlorine, or alkenyloxy having 2 to 12 carbons in which at least one piece of hydrogen is replaced by fluorine or chlorine; and b is 1, 2, 3 or 4; in which, compounds represented by formula (1-1) and formula (1-2) are excluded.

10. The liquid crystal composition according to claim 7, wherein a proportion of the fourth component is in the range of 3% by weight to 40% by weight based on the weight of the liquid crystal composition.

11. The liquid crystal composition according to claim 1, further containing at least one compound selected from compounds represented by formula (5):

(5)
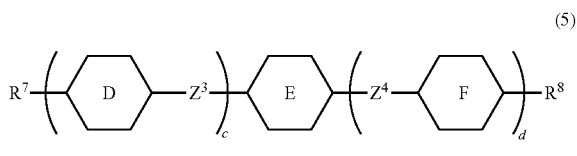

wherein, in formula (5), $R^7$ and $R^8$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

12. The liquid crystal composition according to claim 11, containing at least one compound selected from the group of compounds represented by formula (5-1) to formula (5-22):

(5-1)
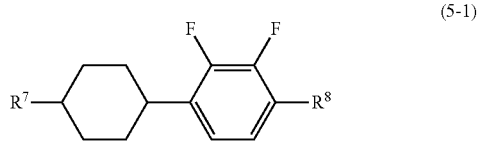

(5-2)
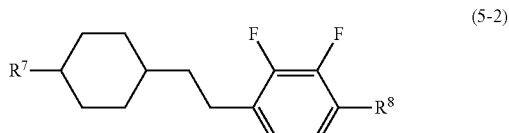

(5-3)
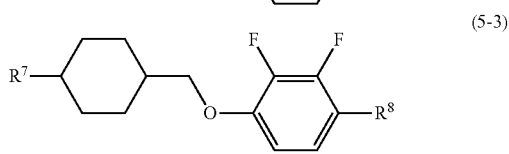

(5-4)
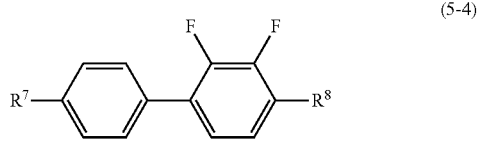

(5-5)
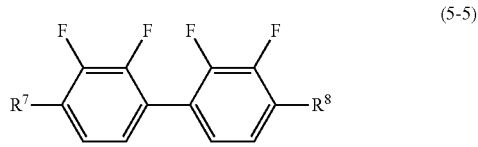

(5-6)
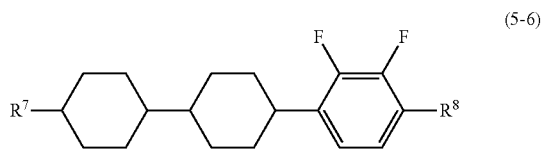

(5-7) 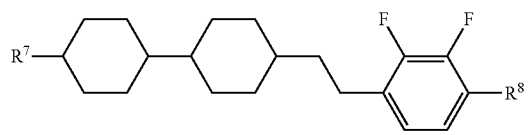

(5-8) 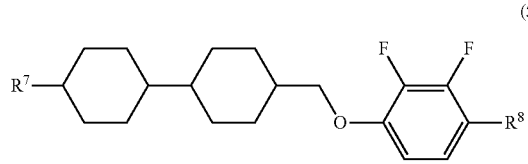

(5-9) 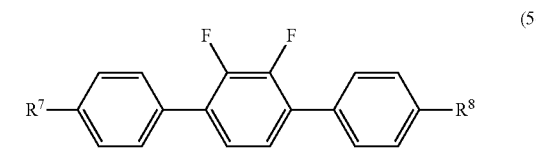

(5-10) 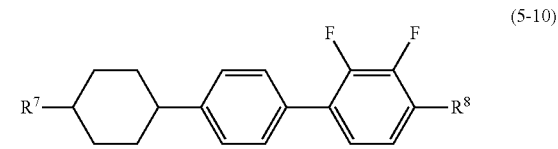

(5-11) 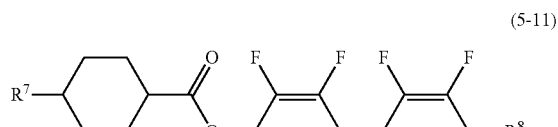

(5-12) 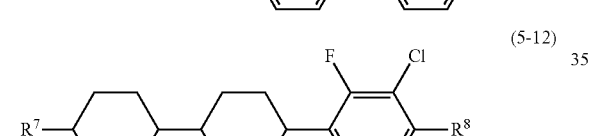

(5-13) 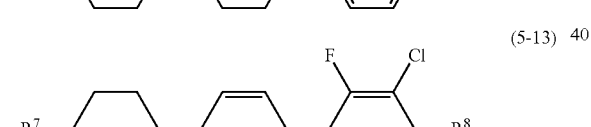

(5-14) 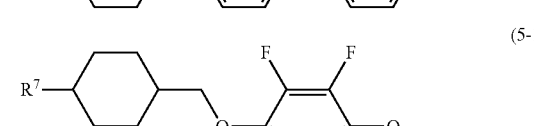

(5-15) 

(5-16) 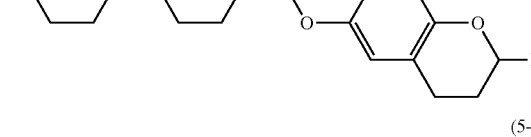

(5-17) 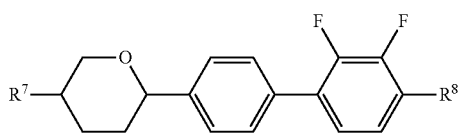

(5-18) 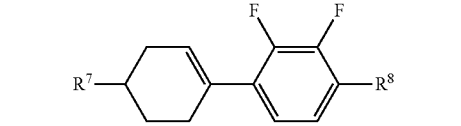

(5-19) 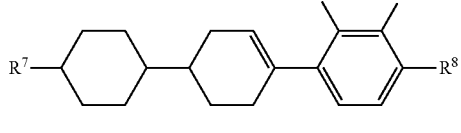

(5-20) 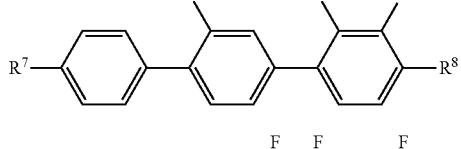

(5-21) 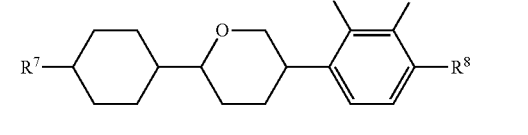

(5-22) 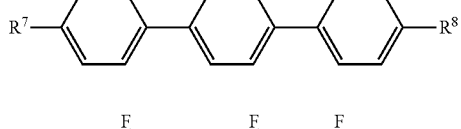

wherein, in formula (5-1) to formula (5-22), $R^7$ and $R^8$ are independently alkyl having 1 to 12 carbons, alkoxy having 1 to 12 carbons, alkenyl having 2 to 12 carbons or alkenyloxy having 2 to 12 carbons.

13. The liquid crystal composition according to claim 4, further containing at least one compound selected from compounds represented by formula (5):

(5) 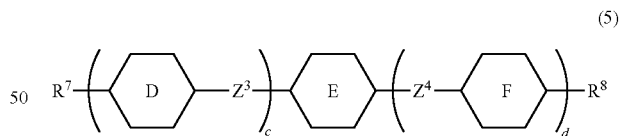

wherein, in formula (5), $R^7$ and $R^8$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

14. The liquid crystal composition according to claim 7, further containing at least one compound selected from compounds represented by formula (5):

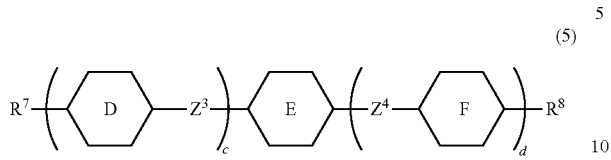

(5)

wherein, in formula (5), $R^7$ and $R^8$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

15. The liquid crystal composition according to claim 9, further containing at least one compound selected from compounds represented by formula (5):

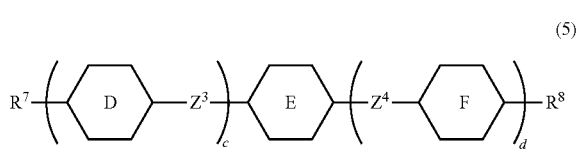

(5)

wherein, in formula (5), $R^7$ and $R^8$ are independently alkyl having 1 to 12 carbons, alkoxy having 1 to 12 carbons, alkenyl having 2 to 12 carbons or alkenyloxy having 2 to 12 carbons; ring D and ring F are independently 1,4-cyclohexylene, 1,4-cyclohexenylene, 1,4-phenylene, 1,4-phenylene in which at least one piece of hydrogen is replaced by fluorine or chlorine, or tetrahydropyran-2,5-diyl; ring E is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^3$ and $Z^4$ are independently a single bond, ethylene, carbonyloxy or methyleneoxy; c is 1, 2 or 3, and d is 0 or 1; and a sum of c and d is 3 or less.

16. The liquid crystal composition according to claim 11, wherein a proportion of the compounds represented by formula (5) is in the range of 3% by weight to 30% by weight based on the weight of the liquid crystal composition.

17. The liquid crystal composition according to claim 1, wherein an elastic constant (K) is 11 pN or more, and a ratio of elastic constant (K) to viscosity ($\eta$) is 0.8 nN/Pa·s (nm²/s) or more.

18. The liquid crystal composition according to claim 1, wherein a frequency dependence ($\Delta\varepsilon$(5 kHz)/$\Delta\varepsilon$(50 Hz)) of dielectric anisotropy at −20° C. is 0.50 or more.

19. A liquid crystal display device, including the liquid crystal composition according to claim 1.

20. The liquid crystal display device according to claim 19, wherein an operating mode in the liquid crystal display device includes a TN mode, an ECB mode, an OCB mode, an IPS mode, an FFS mode or an FPA mode, and a driving mode in the liquid crystal display device includes an active matrix mode.

* * * * *

UNITED STATES PATENT AND TRADEMARK OFFICE
CERTIFICATE OF CORRECTION

PATENT NO. : 10,442,991 B2  
APPLICATION NO. : 15/479285  
DATED : October 15, 2019  
INVENTOR(S) : Naoko Matsuda et al.

Page 1 of 2

It is certified that error appears in the above-identified patent and that said Letters Patent is hereby corrected as shown below:

In the Claims

At Column 41, Claim 5 should read as follows:
5. The liquid crystal composition according to claim 4, wherein the third component further contains at least one compound selected from the group of compounds represented by formula (3-1) to formula (3-4) and formula (3-6) to formula (3-13):

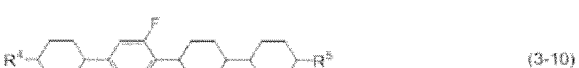

Signed and Sealed this  
Twenty-eighth Day of January, 2020

Andrei Iancu  
*Director of the United States Patent and Trademark Office*

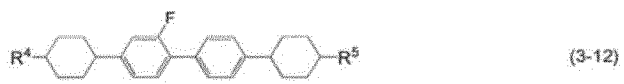
wherein, in formula (3-1) to formula (3-4) and formula (3-6) to formula (3-13), $R^4$ is alkyl having 1 to 12 carbons, alkoxy having 1 to 12 carbons, alkenyl having 2 to 12 carbons or alkenyl having 2 to 12 carbons in which at least one piece of hydrogen is replaced by fluorine or chlorine; and $R^5$ is alkyl having 1 to 12 carbons or alkoxy having 1 to 12 carbons.